US007316457B2

(12) United States Patent
Taniguchi et al.

(10) Patent No.: US 7,316,457 B2
(45) Date of Patent: Jan. 8, 2008

(54) MOTION CONTROL APPARATUS FOR FOUR-WHEEL DRIVE VEHICLE

(75) Inventors: Masahiko Taniguchi, Kariya (JP); Koji Tanimoto, Kariya (JP); Yoshiyuki Tanaka, Tokyo-to (JP); Jun-ichi Kurosawa, Tokyo-to (JP)

(73) Assignees: Advics Co., Ltd., Kariya, Aichi-Pref. (JP); Fuji Jukogyo Kabushiki Kaisha, Shinjuku-Ku, Tokyo-To (JP)

( * ) Notice: Subject to any disclaimer, the term of this patent is extended or adjusted under 35 U.S.C. 154(b) by 269 days.

(21) Appl. No.: 11/234,272

(22) Filed: Sep. 26, 2005

(65) Prior Publication Data

US 2006/0071551 A1    Apr. 6, 2006

(30) Foreign Application Priority Data

Sep. 27, 2004    (JP) .............................. 2004-278721

(51) Int. Cl.
   *B60T 8/24*    (2006.01)
(52) U.S. Cl. ................. 303/147; 303/169; 303/190; 701/72
(58) Field of Classification Search ............... 303/146, 303/147, 148, 169, 170, 140, 143, 190; 701/70, 701/72, 81
See application file for complete search history.

(56) References Cited

U.S. PATENT DOCUMENTS 5,722,743 A *   3/1998  Sano ........................... 303/146

| 5,850,616 | A  | * | 12/1998 | Matsuno et al. ............... 701/82 |
| 6,132,014 | A  | * | 10/2000 | Kiso et al. ................... 303/146 |
| 6,183,052 | B1 | * | 2/2001  | Harada et al. .............. 303/147 |
| 6,974,195 | B2 | * | 12/2005 | Batistic et al. .............. 303/146 |

FOREIGN PATENT DOCUMENTS

JP    2004-066941    3/2004

* cited by examiner

*Primary Examiner*—Thomas Williams
(74) *Attorney, Agent, or Firm*—Buchanan Ingersoll & Rooney PC

(57) ABSTRACT

A motion control apparatus for a four-wheel drive vehicle performs over-steer suppressing control when the vehicle is in an over-steer state so as to apply a braking force to a front wheel located on the outer side of a turning locus without lowering engine output, and performs LSD control for the front/rear wheels when the obtained difference between wheel speeds of the left and right wheels exceeds an allowable limit so as to apply a braking force for suppressing idle rotation to the one of the left and right wheels that is of higher wheel speed. During execution of the over-steer suppression control, the braking force for suppressing front-wheel idle rotation to be imparted to the front wheel located on the inner side of the turning locus by means of the front-wheel-side LSD control is lowered, whereby the rear wheels become unlikely to produce excessive idle rotation.

7 Claims, 11 Drawing Sheets

MOTION CONTROL APPARATUS FOR FOUR-WHEEL DRIVE VEHICLE

BACKGROUND OF THE INVENTION

1. Field of the Invention

The present invention relates to a motion control apparatus for a four-wheel drive vehicle in which drive force of a drive source is transmitted to front and rear wheels. In particular, the present invention relates to a motion control apparatus that performs idle-rotation suppression control for the front and rear wheels when the difference in wheel speed between left and right wheels exceeds an allowable limit, so as to impart braking force for suppressing idle rotation to the wheel of the left and right wheels that is of the higher wheel speed, and also performs vehicle stabilization control which imparts braking force to the front wheel located on the outer side of a turning locus in order to generate a yawing moment in a direction opposite the vehicle's yawing direction when the vehicle is in a state of over-steer.

2. Description of the Related Art

Conventionally, there has been widely known a vehicle motion control apparatus that performs the above-described vehicle stabilization control (over-steer suppression control) in order to maintain running stability of the vehicle during turning (see, for example, Japanese Patent Application Laid-Open (kokai) No. 2004-66941). Specifically, a vehicle motion control apparatus of such a type determines that the vehicle is in a state of over-steer, for example, when the difference between the actual yaw rate obtained from a yaw rate sensor and a yaw rate calculated from steering angle (turn angle of the steering wheels), vehicle body speed, specifications of the vehicle, etc., exceeds a predetermined threshold value.

Which the vehicle is determined to be in an over-steer state, in general, the apparatus of such a type imparts a predetermined braking force, by means of brake hydraulic pressure, to the front wheel located on the outer side of a turning locus in order to generate a yawing moment (over-steer suppressing moment) in the vehicle in a direction opposite the vehicle's yawing direction. In addition, in order to reduce the centrifugal force acting on the vehicle, the apparatus reduces the output of the engine by a predetermined amount to thereby lower the vehicle body speed.

Meanwhile, there has also been widely known a vehicle motion control apparatus which performs the above-described idle-rotation suppression control in order to secure the running performance (performance of running through mud or the like) and escaping performance (performance of escaping from mud or the like) of the vehicle, in particular, on unpaved roads (see, for example, PCT Application Publication No. WO91/04895). Specifically, when the difference in wheel speed between left and right wheels (driven wheels) obtained from, for example, wheel speed sensors, exceeds an allowable limit, the motion control apparatus of such a type imparts a predetermined braking force, by means of brake hydraulic pressure, to the one of the left and right wheels that is of higher wheel speed. This secures sufficient distribution of the engine output (torque) to the wheel to which the above-described braking force is not imparted. As a result, the running performance and the escaping performance of the vehicle are secured.

In recent years, there has been demand for maintaining the running stability of a vehicle during turning, while securing the running performance and the escaping performance of the vehicle. Such demand is strong in particular for four-wheel drive vehicles (in which drive force of a drive source is transmitted to front and rear wheels (i.e., both the front and rear wheels are driven wheels). In order to meet the demand, the four-wheel drive vehicle may be equipped with a motion control apparatus which performs the above-mentioned idle-rotation suppression control for both the front wheels and the rear wheels, as well as the above-mentioned vehicle stabilization control.

Incidentally, in general, when the output of an engine mounted on a vehicle once decreases, a relatively long time is required for the output to return to the level before the decrease. As a result, the running performance and the escaping performance of the vehicle lower over a period between a time when the output of the engine decreases and a time when the output returns to the original level. In other words, reducing the engine output for the above-mentioned vehicle stabilization control results in a decrease in the running performance and the escaping performance of the vehicle.

Accordingly, when the motion control apparatus which performs the above-mentioned idle-rotation suppression control for both the front wheels and the rear wheels and also performs the above-mentioned vehicle stabilization control is applied to a four-wheel drive vehicle in order to prevent a decrease in the running performance and the escaping performance of the vehicle, it is conceivably desired to impart a predetermined braking force to the front wheel located on the outer side of a turning locus, without reducing the engine output for the above-mentioned vehicle stabilization control.

However, in such a case, the following problems arise. Here, a case is considered in which a driver demands a higher engine output when the vehicle stabilization control is being performed; i.e., a predetermined braking force is being imparted to the front wheel located on the outer side of a turning locus. In this case, the high engine output is mainly distributed to three wheels other than the front wheel located on the outer side of the turning locus.

At this time, although excessive engine output is distributed to the front wheel located on the inner side of the turning locus, a predetermined braking force is imparted to the front wheel located on the inner side of the turning locus by means of the idle-rotation suppression control for the front wheels. With this idle-rotation suppression control, braking forces are applied to the two front wheels, so that the two front wheels become less likely to produce excessive idle rotation. Accordingly, the cornering force generated by means of tires of the two front wheels can be maintained.

Meanwhile, when the two front wheels become less likely to produce excessive idle rotation as a result of application of braking forces to both the front wheels, excessive engine output becomes likely to be distributed to the two rear wheels. In addition, there is no possibility that high engine output is distributed to only one of the two rear wheels (e.g., the rear wheel located on the inner side of the turning locus) because of the idle-rotation suppression control for the rear wheels. Accordingly, the two rear wheels become more likely to produce excessive idle rotations, and as a result, the cornering force generated by means of tires of the two rear wheels becomes likely to decrease.

When the cornering force generated by means of tires of the two rear wheels decreases with the cornering force generated by means of tires of the two front wheels maintained, a yawing moment of the same direction as the vehicle's yawing direction is generated in the vehicle. In other words, there is generated a yawing moment whose direction is opposite the direction of a yawing moment to be generated by means of the above-described vehicle stabilization control.

Accordingly, the over-steer suppressing effect by the vehicle stabilization control cannot be reliably achieved, and as a result, the running stability of the vehicle cannot be maintained. In other words, in the case where the operation of lowering the engine output during execution of the vehicle stabilization control is eliminated in order to secure the running performance and the escaping performance of the vehicle, when the above-mentioned idle-rotation suppression control is also executed during execution of the vehicle stabilization control, there arises a problem that in some cases the running stability of the vehicle cannot be reliably maintained.

SUMMARY OF THE INVENTION

In view of the forgoing, an object of the present invention is to provide a motion control apparatus for a four-wheel drive vehicle which can secure the running performance and the escaping performance of the vehicle and can reliably maintain the running stability of the vehicle.

A motion control apparatus according to the present invention is applied to a four-wheel drive vehicle in which both the front wheels and rear wheels are driven wheels, and comprises stabilization control execution means, front-wheel-side idle rotation suppression control means, and rear-wheel-side idle rotation suppression control means. These means will be described successively.

The stabilization control execution means is a means for obtaining a value representing the degree of over-steer in a turning state of the vehicle and, when the obtained value representing the degree of over-steer exceeds a threshold value, performing vehicle stabilization control (over-steer suppression control) which imparts to a front wheel located on the outer side of a turning locus a braking force for generating in the vehicle a yawing moment of a direction opposite the direction of yawing of the vehicle.

Examples of the value representing the degree of over-steer include, but are not limited to, the difference (hereinafter referred to as "yaw rate deviation) between the actual yaw rate of the vehicle and a yaw rate of the vehicle calculated on the basis of a turning angle of the steering wheels of the vehicle and a vehicle body speed of the vehicle; a vehicle body slip angle, which is an angle between the fore-aft direction of the vehicle body and the heading direction of the vehicle body; a change rate of the vehicle body slip angle; or a value based on at least one of these values.

By virtue of the stabilization control execution means, when the value representing the degree of over-steer (e.g., yaw rate deviation) exceeds the threshold value (that is, the vehicle has entered an over-steer state), a yawing moment of a direction opposite the vehicle's yawing direction is imparted to the vehicle. As a result, the over-steer state is suppressed, and the running stability of the vehicle during turning can be maintained.

The front-wheel-side idle rotation suppression control means is a means for obtaining a difference between wheel speeds of the left and right front wheels, and, when the obtained difference between wheel speeds of the left and right front wheels exceeds a front-wheel-side allowable limit, imparting a braking force for suppressing front-wheel idle rotation to the one of the left and right front wheels that is of higher wheel speed.

Preferably, the braking force for suppressing front-wheel idle rotation is changed in accordance with the obtained difference between wheel speeds of the left and right front wheels. In this case, for example, the braking force for suppressing front-wheel idle rotation is set on the basis of the difference between wheel speeds of the left and right front wheels such that the greater the difference, the greater the braking force.

For setting of the braking force for suppressing front-wheel idle rotation, there may be used, for example, a previously prepared table (map) which defines a relation between the difference between wheel speeds of the left and right front wheels and the braking force for suppressing front-wheel idle rotation, or a previously obtained function for obtaining the braking force for suppressing front-wheel idle rotation while using the difference between wheel speeds of the left and right front wheels as an argument.

By virtue of the front-wheel-side idle rotation suppression control means, when the difference between wheel speeds of the left and right front wheels exceeds the front-wheel-side allowable limit, a braking force for suppressing front-wheel idle rotation is imparted to the one of the left and right front wheels that is of higher wheel speed. With this operation, sufficient distribution of engine output (torque) to the front wheel to which the above-mentioned braking force is not imparted can be secured.

Similarly, the rear-wheel-side idle rotation suppression control means is a means for obtaining a difference between wheel speeds of the left and right rear wheels, and, when the obtained difference between wheel speeds of the left and right rear wheels exceeds a rear-wheel-side allowable limit, imparting a braking force for suppressing rear-wheel idle rotation to the one of the left and right rear wheels that is of higher wheel speed.

Preferably, the braking force for suppressing rear-wheel idle rotation is changed in accordance with the obtained difference between wheel speeds of the left and right rear wheels. In this case, for example, the braking force for suppressing rear-wheel idle rotation is set on the basis of the difference between wheel speeds of the left and right rear wheels such that the greater the difference, the greater the braking force.

For setting of the braking force for suppressing rear-wheel idle rotation, there may be used, for example, a previously prepared table (map) which defines a relation between the difference between wheel speeds of the left and right rear wheels and the braking force for suppressing rear-wheel idle rotation, or a previously prepared function for obtaining the braking force for suppressing rear-wheel idle rotation while using the difference between wheel speeds of the left and right rear wheels as an argument.

By virtue of the rear-wheel-side idle rotation suppression control means, like the case of the front-wheel-side idle rotation suppression control means, when the difference between wheel speeds of the left and right rear wheels exceeds the rear-wheel-side allowable limit, a braking force for suppressing rear-wheel idle rotation is imparted to the one of the left and right rear wheels that is of higher wheel speed. With this operation, sufficient distribution of engine output to the rear wheel to which the above-mentioned braking force is not imparted can be secured. Through cooperation of the front-wheel-side idle rotation suppression control means and the rear-wheel-side idle rotation suppression control means, the running performance and the escaping performance of the vehicle can be secured.

In addition, the front-wheel-side idle rotation suppression control means is configured such that when the vehicle stabilization control is being performed, the control means lowers the braking force for suppressing front-wheel idle rotation to be imparted to the one of the left and right front wheels that is of higher wheel speed (as compared with the case where the vehicle stabilization control is not being performed).

In this case, the front-wheel-side idle rotation suppression control means may be configured such that when the vehicle stabilization control is being performed, the control means lowers the braking force for suppressing front-wheel idle rotation, while making larger the front-wheel side allowable limit (as compared with the case where the vehicle stabilization control is not being performed). Alternatively, the front-wheel-side idle rotation suppression control means may be configured such that when the vehicle stabilization control is being performed, the control means lowers the braking force for suppressing front-wheel idle rotation, without changing the front-wheel side allowable limit. Alternatively, the front-wheel-side idle rotation suppression control means may be configured to lower the braking force for suppressing front-wheel idle rotation only when a specific condition is satisfied; for example, when a specific switch or the like operated by a driver is in a specific state.

With this configuration, the braking force for suppressing front-wheel idle rotation imparted to the one of the left and right front wheels that is of higher wheel speed is reduced during execution of the vehicle stabilization control. Accordingly, when the driver demands a higher engine output during a period in which the vehicle stabilization control is performed (that is, a braking force is imparted to the front wheel located on the outer side of a turning locus) with the resultant distribution of excessive engine output to the other front wheel located on the inner side of the turning locus, the front wheel located on the inner side of the turning locus (the front wheel of higher wheel speed) is intentionally permitted to produce excessive idle rotation (drive slip). Accordingly, the cornering force generated by means of the tire of the front wheel located on the inner side of the turning locus decreases, and thus, the total sum of the cornering forces generated by means of the tires of the two front wheels decreases.

Meanwhile, in this case, when the front wheel located on the inner side of the turning locus produces excessive idle rotation, a portion of the engine output (surplus engine output) is consumed by the excessive idle rotation, and as a result, excessive engine output becomes less likely to be distributed to the two rear wheels. Accordingly, the two rear wheels become unlikely to produce excessive idle rotation, and as a result, the cornering forces generated by means of tires of the two rear wheels can be maintained.

As described above, when the cornering force generated by means of the tires of the two front wheels decreases with the cornering force generated by means of the tires of the two rear wheels maintained, a yawing moment of a direction opposite the vehicle's yawing direction is generated in the vehicle. In other word, a yawing moment is generated in the same direction as that of a yawing moment to be generated by means of the vehicle stabilization control.

Accordingly, the over-steer suppressing effect by the vehicle stabilization control can be reliably achieved. In other words, the running stability of the vehicle can be reliably maintained even in the case where the above-mentioned stabilization control execution means is configured not to lower the engine output during execution of the vehicle stabilization control in order to secure the running performance and the escaping performance of the vehicle, and the idle suppression control is simultaneously executed during execution of the vehicle stabilization control.

As described above, according to the motion control apparatus according to the present invention, when the above-mentioned stabilization control execution means is configured not to lower the engine output during execution of the vehicle stabilization control, the running performance and the escaping performance of the vehicle can be secured, and the running stability of the vehicle can be reliably maintained.

In the motion control apparatus according to the present invention, the front-wheel-side idle rotation suppression control means is preferably configured to change the extent to which the braking force for suppressing front-wheel idle rotation is reduced, in accordance with the value representing the degree of over-steer (for example, yaw rate deviation).

During execution of the vehicle stabilization control, the smaller the braking force for suppressing front-wheel idle rotation, the greater the easiness of generation of excessive idle rotation of the front wheel located on the inner side of the turning locus, and the smaller the likelihood of excessive engine output being distributed to the two rear wheels. That is, the smaller the braking force for suppressing front-wheel idle rotation, the greater the likelihood of maintaining the running stability of the vehicle.

Meanwhile, the greater the degree of over-steer, the greater the degree of demand for maintaining the running stability of the vehicle. In view of the above, conceivably, the braking force for suppressing front-wheel idle rotation is preferably lowered as the degree of over-steer increases.

The above-described configuration is based on such knowledge. That is, by virtue of the above-described configuration, the extent to which the braking force for suppressing front-wheel idle rotation is reduced can be increased (that is, the braking force for suppressing front-wheel idle rotation can be reduced) as the degree of over-steer increases. Accordingly, a proper braking force for suppressing front-wheel idle rotation, which braking force corresponds to the degree of over-steer, can be set.

In this case, preferably, the front-wheel-side idle rotation suppression control means is configured to set the braking force for suppressing front-wheel idle rotation on the basis of the difference between wheel speeds of the left and right front wheels such that the greater the difference, the greater the braking force, and control-use wheel-speed-difference determination means is provided in order to determine a control-use front-wheel-side wheel speed difference on the basis of the value representing the degree of over-steer, the control-use front-wheel-side wheel speed-difference being smaller than the obtained difference between wheel speeds of the left and right front wheels. When the vehicle stabilization control is being executed, the braking force for suppressing front-wheel idle rotation is set on the basis of the determined control-use front-wheel-side wheel speed difference instead of the obtained difference between wheel speeds of the left and right front wheels.

In this case, preferably, the control-use wheel-speed-difference determination means determines the control-use front-wheel-side wheel speed difference on the basis of the value representing the degree of over-steer, such that the greater the value representing the degree of over-steer, the smaller the control-use front-wheel-side wheel speed difference.

More specifically, preferably, the control-use wheel-speed-difference determination means obtains a correction value in relation to the difference between wheel speeds of the left and right front wheels on the basis of the value representing the degree of over-steer, and uses, as the control-use front-wheel-side wheel speed difference, a value obtained by subtracting the obtained correction value from the obtained difference between wheel speeds of the left and right front wheels. Here, the correction value is preferably set such that the greater the degree of over-steer, the greater the correction value.

By virtue of this configuration, through use of a previously prepared table (map) or a previously obtained function, the braking force for suppressing front-wheel idle rotation is basically (that is, during a period in which the vehicle stabilization control is not executed) determined on the basis of the obtained difference between wheel speeds of the left and right front wheels, such that the greater the difference, the greater the braking force. Meanwhile, the control-use front-wheel-side wheel speed difference can be determined such that the greater the value representing the degree of over-steer, the smaller the control-use front-wheel-side wheel speed difference as compared with the obtained difference between wheel speeds of the left and right front wheels.

In addition, when the vehicle stabilization control is being executed, the braking force for suppressing front-wheel idle rotation is set on the basis of the determined control-use front-wheel-side wheel speed difference (apparent wheel speed difference) instead of the obtained difference between wheel speeds of the left and right front wheels. That is, when the vehicle stabilization control is being executed, through use of a table or the like identical to the above-described table or the like, the braking force for suppressing front-wheel idle rotation can be set such that the greater the value representing the degree of over-steer, the smaller the braking force for suppressing front-wheel idle rotation.

In other words, without separately preparing a table, function, or the like for setting the braking force for suppressing front-wheel idle rotation which is used only when the vehicle stabilization control is being executed, the extent to which the braking force for suppressing front-wheel idle rotation is reduced can be changed in accordance with the value representing the degree of over-steer when the vehicle stabilization control is being executed. Accordingly, the above-described configuration can reduce the labor of preparing a table, function, or the like for setting the braking force for suppressing front-wheel idle rotation, and save the storage area (ROM area) for storing the table, function, or the like.

Notably, the operation of setting the braking force for suppressing front-wheel idle rotation on the basis of the determined control-use front-wheel-side wheel speed difference (apparent wheel speed difference), which is smaller than the obtained difference between wheel speeds of the left and right front wheels, instead of the obtained difference between wheel speeds of the left and right front wheels, corresponds to an operation of apparently increasing the front-wheel side allowable limit by an amount corresponding to the difference between the obtained difference between wheel speeds of the left and right front wheels and the control-use front-wheel-side wheel speed difference.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which:

FIG. 9 is a flowchart showing a routine executed by the CPU shown in FIG. 1 for calculating wheel speeds and the like;

DETAILED DESCRIPTION OF THE PREFERRED EMBODIMENT

Figure 1:
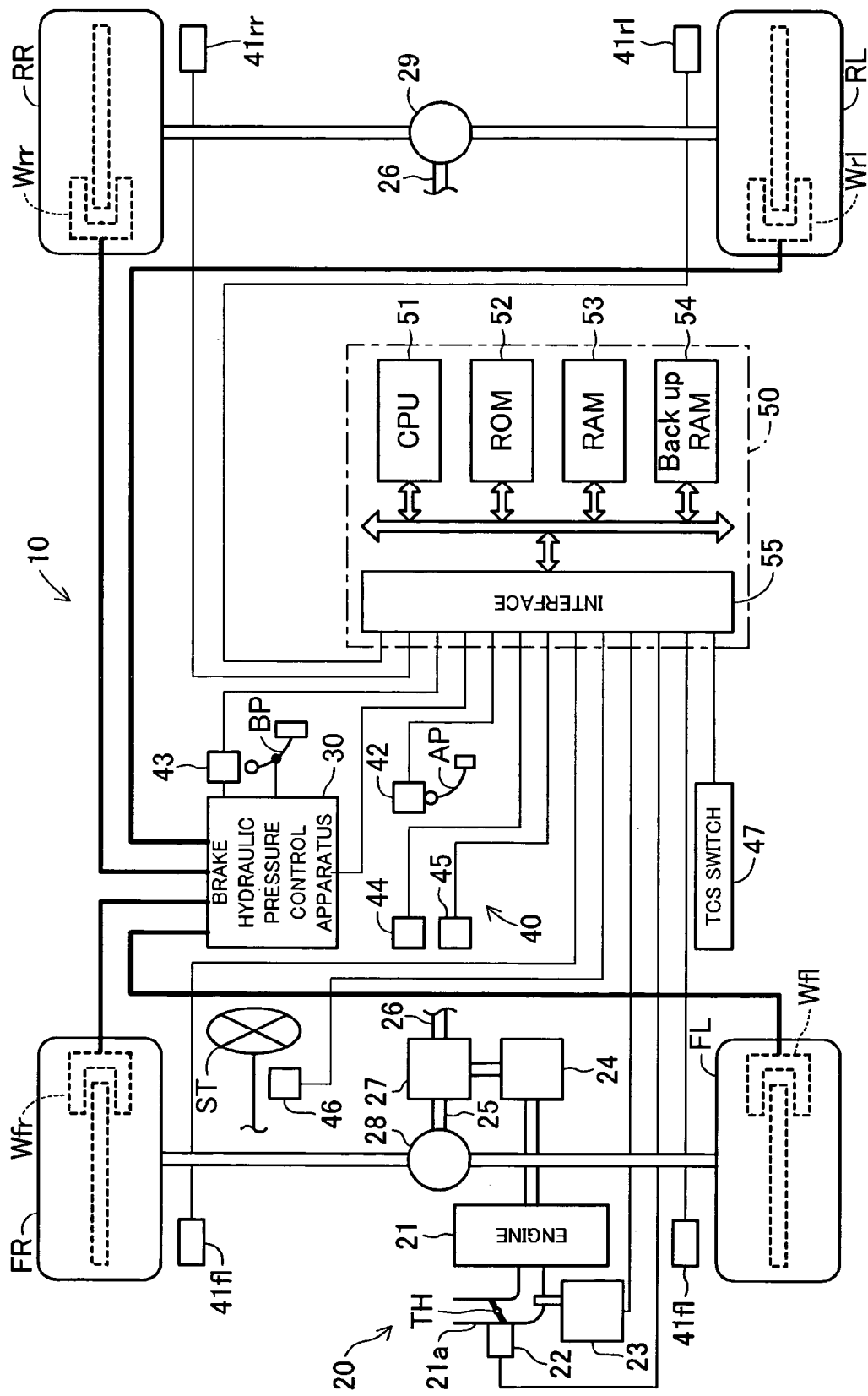
FIG. 1 is a schematic structural diagram of a four-wheel drive vehicle equipped with a vehicle motion control apparatus according to an embodiment of the present invention.

Below, a motion control apparatus for a four-wheel drive vehicle according to an embodiment of the present invention will be described while referring to the drawings. FIG. 1 schematically illustrates a vehicle on which a motion control apparatus 10 according to the embodiment of the present invention is mounted. The illustrated vehicle is a four-wheel drive vehicle whose four wheels are all driven wheels.

This motion control apparatus 10 has a drive force transmission mechanism section 20 which generates a drive force and transmits it to the drive wheels FL, FR, RL, and RR; a brake hydraulic pressure control apparatus 30 for generating a braking force in each wheel by brake hydraulic pressure; a sensor section 40 comprising various sensors; and an electronic control apparatus 50.

The drive force transmission mechanism section 20 comprises an engine 21 which generates a drive force; a throttle valve actuator 22 comprising a DC motor which controls the opening TA of a throttle valve TH which is disposed in the intake pipe 21a of the engine 21 and which varies the open cross-sectional area of the intake passage; a fuel injection apparatus 23 which includes unillustrated fuel injectors which spray fuel in the vicinity of unillustrated intake ports of the engine 21; and a transmission 24 whose input shaft is connected to the output shaft of the engine 21.

The drive force transmission mechanism section 20 comprises a transfer 27 which receives the drive force from the output shaft of the transmission 24, and properly distributes and transmits the drive force to a front-wheel-side propeller shaft 25 and a rear-wheel-side propeller shaft 26; a front-wheel-side differential 28 which receives the front-wheel-side drive force from the front-wheel-side propeller shaft 25, and properly distributes and transmits the front-wheel-side drive force to the front wheels FL and FR; and a rear-wheel-side differential 29 which receives the rear-wheel-side drive force from the rear-wheel-side propeller shaft 26, and properly distributes and transmits the rear-wheel-side drive force to the rear wheels RR and RL.

Figure 2:
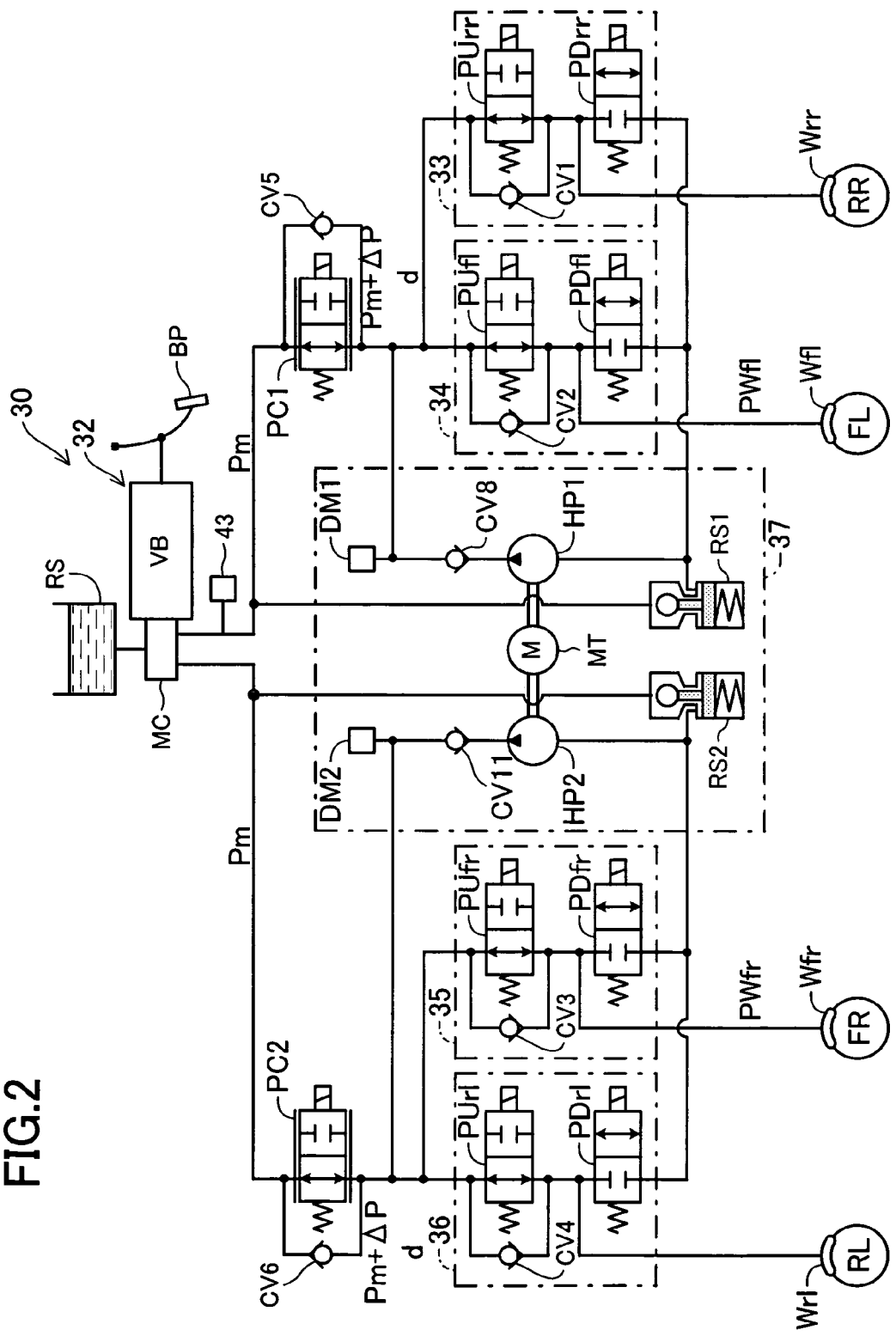
FIG. 2 is a schematic structural diagram of the brake hydraulic pressure control apparatus shown in FIG. 1.

As schematically shown in FIG. 2, the brake hydraulic pressure control apparatus 30 includes a brake hydraulic pressure generating section 32 which generates brake hydraulic pressure corresponding to the operating force of a brake pedal BP; an RR brake hydraulic pressure adjusting section 33, an FL brake hydraulic pressure adjusting section 34, an FR brake hydraulic pressure adjusting section 35, and an RL brake hydraulic pressure adjusting section 36, which can adjust the brake hydraulic pressures supplied to corresponding wheel cylinders Wrr, Wfl, Wfr, and Wrl respectively installed on the wheels RR, FL, FR, and RL; and a return brake fluid supply section 37.

The brake hydraulic pressure generating section 32 includes a vacuum booster VB which operates in response to operation of the brake pedal BP, and a master cylinder MC which is linked to the vacuum booster VB. The vacuum booster VB utilizes the pressure (negative pressure) of air within an intake pipe of the engine 21 so as to boost the operating force of the brake pedal BP by a prescribed ratio and transmits the boosted operating force to the master cylinder MC.

The master cylinder MC has two output ports; i.e., a first port and a second port. The master cylinder MC receives brake fluid from a reservoir RS, and generates from the first port a first master cylinder hydraulic pressure Pm corresponding to the boosted operating force. The master cylinder MC also generates from the second port a second master cylinder hydraulic pressure Pm which is substantially the same as the first master cylinder hydraulic pressure and which corresponds to the boosted operating force.

The structures and operations of the master cylinder MC and the vacuum booster VB are well known, and therefore an explanation of the details thereof will be omitted. In this manner, the master cylinder MC and the vacuum booster VB (brake hydraulic pressure generation means) generate first and second master cylinder hydraulic pressures corresponding to the operating force of the brake pedal BP.

A normally-open linear solenoid valve PC1 is interposed between the first port of the master cylinder MC and the upstream side of the RR brake hydraulic pressure adjusting section 33 and the upstream side of the FL brake hydraulic pressure adjusting section 34. Similarly, a normally-open linear solenoid valve PC2 is interposed between the second port of the master cylinder MC and the upstream side of the FR brake hydraulic pressure adjusting section 35 and the upstream side of the RL brake hydraulic pressure adjusting section 36. The details of the normally-open linear solenoid valves PC1 and PC2 will be described later.

The RR brake hydraulic pressure adjusting section 33 consists of a pressure-increasing valve PUrr, which is a normally-open solenoid valve of a 2-port, 2-position type, and a pressure-reducing valve PDrr, which is a normally-closed solenoid valve of a 2-port, 2-position type. The pressure-increasing valve PUrr establishes and breaks communication between the upstream side of the RR brake hydraulic pressure adjusting section 33 and the wheel cylinder Wrr, which will be described later. The pressure-reducing valve PDrr establishes and breaks communication between the wheel cylinder Wrr and a reservoir RS1. Therefore, through control of the pressure-increasing valve PUrr and the pressure-reducing valve PDrr, the brake hydraulic pressure within the wheel cylinder Wrr (wheel cylinder pressure PWrr) can be increased, maintained, and reduced.

In addition, a check valve CV1 which allows flow of the brake fluid in only one direction from the wheel cylinder Wrr side to the upstream side of the RR brake hydraulic pressure adjusting section 33 is connected in parallel with the pressure-increasing valve PUrr. As a result, when the brake pedal BP is released after being operated, the wheel cylinder pressure PWrr is rapidly decreased.

Similarly, the FL brake hydraulic pressure adjusting section 34, the FR brake hydraulic pressure adjusting section 35, and the RL brake hydraulic pressure adjusting section 36 comprise a pressure-increasing valve PUfl and a pressure-reducing valve PDfl, a pressure-increasing valve PUfr and a pressure-reducing valve PDfr, and a pressure-increasing valve PUrl and a pressure-reducing valve PDrl, respectively. Through control of each pressure-increasing valve and pressure-reducing valve, the brake hydraulic pressure in the wheel cylinder Wfl, the wheel cylinder Wfr, and the wheel cylinder Wrl (wheel cylinder pressures PWfl, PWfr, PWrl) can be increased, maintained, or decreased. Checks valves CV2, CV3, and CV4 are provided in parallel with the pressure-increasing valves PUfl, PUfr, and PUrl, respectively, to provide the same function as that of the check valve CV1.

The return brake fluid supply section 37 includes a DC motor MT, and two hydraulic pumps (gear pumps) HP1 and HP2 simultaneously driven by the motor MT. The hydraulic pump HP1 pumps the brake fluid returned from the pressure reducing values PDrr and PDfl to the reservoir RS1, and supplies the pumped brake fluid to the upstream sides of the RR brake hydraulic pressure adjusting section 33 and the FL brake hydraulic pressure adjusting section 34 via a check valve CV8.

Similarly, the hydraulic pump HP2 pumps the brake fluid returned from the pressure reducing values PDfr and PDrl to the reservoir RS2, and supplies the pumped brake fluid to the upstream sides of the FR brake hydraulic pressure adjusting section 35 and the RL brake hydraulic pressure adjusting section 36 via a check valve CV11. Notably, in order to reduce pulsations of discharge pressures of the hydraulic pumps HP1 and HP2, a damper DM1 is disposed in a hydraulic circuit between the check valve CV8 and the normally-open linear solenoid valve PC1, and a damper DM2 is disposed in a hydraulic circuit between the check valve CV11 and the normally-open linear solenoid valve PC2.

Next, the normally-open linear solenoid valve PC1 will be described. The valve body of the normally-open linear solenoid valve PC1 always receives force in the opening direction stemming from urging force of an unillustrated coil spring, and also receives force in the opening direction stemming from the differential pressure obtained through subtraction of the first master cylinder pressure Pm from the pressure at the upstream side of the RR brake hydraulic pressure adjusting section 33 and the FL brake hydraulic pressure adjusting section 34 (hereinafter may be simply referred to as "actual differential pressure") and force in the closing direction stemming from attraction force which increases in proportion to current supplied to the normally-open linear solenoid valve PC1 (i.e., instruction current Id).

Figure 3:
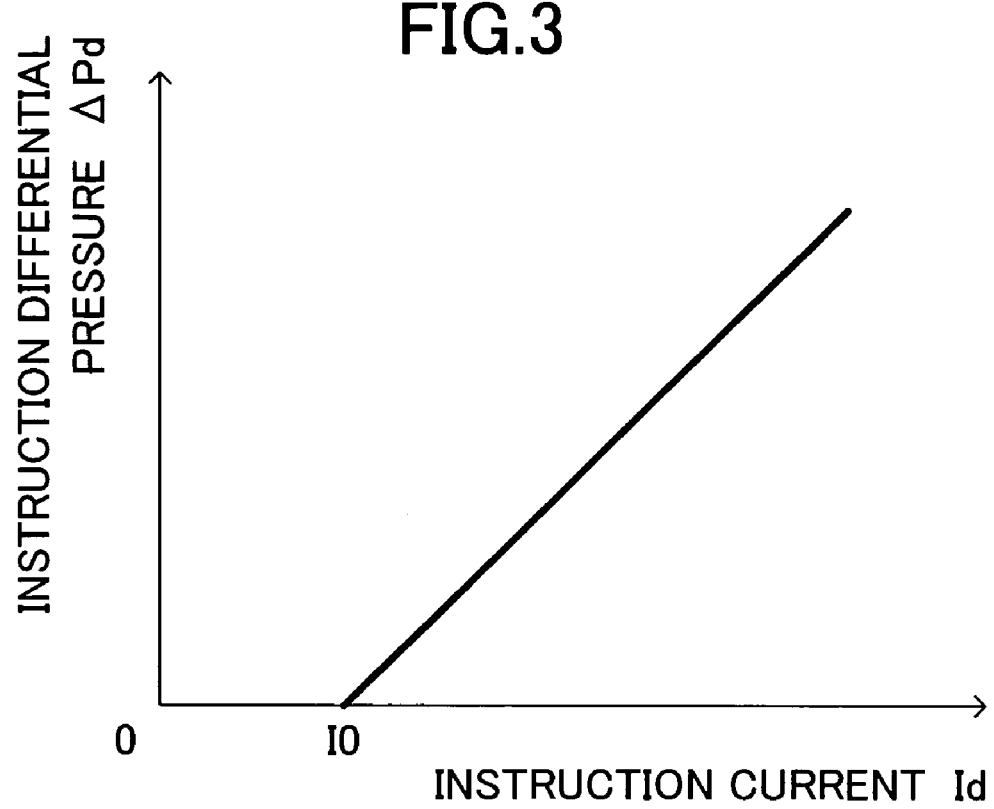
FIG. 3 is a graph showing the relation between a command current and a command differential pressure regarding the normally-open linear solenoid valve shown in FIG. 2.

As a result, as shown in FIG. 3, instruction differential pressure ΔPd corresponding to the attraction force is determined such that it increases in proportion to the instruction current Id. In FIG. 3, I0 represents a current value corresponding to the urging force of the coil spring. When the instruction differential pressure ΔPd is greater than the above-described actual differential pressure, the normally-open linear solenoid valve PC1 closes so as to break the communication between the first port of the master cylinder MC, and the upstream portion of the RR brake hydraulic pressure adjusting section 33 and the upstream portion of the FL brake hydraulic pressure adjusting section 34.

Meanwhile, when the instruction differential pressure ΔPd is less than the actual differential pressure, the normally-open linear solenoid valve PC1 opens so as to establish the communication between the first port of the master cylinder MC, and the upstream portion of the RR brake hydraulic pressure adjusting section 33 and the upstream portion of the FL brake hydraulic pressure adjusting section 34. As a result, the brake fluid at the upstream portion of the RR brake hydraulic pressure adjusting section 33 and the upstream portion of the FL brake hydraulic pressure adjusting section 34 (supplied from the hydraulic pump HP1) flows toward the first port of the master cylinder MC via the normally-open linear solenoid valve PC1, whereby the actual differential pressure is adjusted to coincide with the instruction differential pressure ΔPd. Notably, the brake fluid flowing into the first port of the master cylinder MC is returned to the reservoir RS1.

In other words, when the motor MT (accordingly, the hydraulic pumps HP1 and HP2) is driven, the actual differential pressure (its allowable maximum value) can be controlled in accordance with the instruction current Id of the normally-open linear solenoid valve PC1. At that time, the pressure on the upstream side of the RR brake hydraulic pressure adjusting section 33 and the FL brake hydraulic pressure adjusting section 34 becomes equal to the sum (Pm+ΔPd) of the first maser cylinder pressure Pm and the actual differential pressure (i.e., the instruction differential pressure ΔPd).

Meanwhile, when the normally-open linear solenoid valve PC1 is brought into an unexcited state (i.e., when the instruction current Id is set to zero), the normally-open linear solenoid valve PC1 maintains its open state because of urging force of the coil spring. At this time, the actual differential pressure becomes zero, and the pressure on the upstream side of the RR brake hydraulic pressure adjusting section 33 and the FL brake hydraulic pressure adjusting section 34 becomes equal to the first master cylinder pressure Pm.

The normally-open linear solenoid valve PC2 is the same as the normally-open linear solenoid valve PC1 in terms of structure and operation. Accordingly, when the motor MT (accordingly, the hydraulic pumps HP1 and HP2) is driven, the actual differential pressure is controlled in accordance with the instruction current Id of the normally-open linear solenoid valve PC2, whereby the pressure on the upstream side of the FR brake hydraulic pressure adjusting section 35 and the RL brake hydraulic pressure adjusting section 36 becomes equal to the sum (Pm+ΔPd) of the second master cylinder pressure Pm and the instruction differential pressure ΔPd. Meanwhile, when the normally-open linear solenoid valve PC2 is brought into an unexcited state, the pressure on the upstream side of the FR brake hydraulic pressure adjusting section 35 and the RL brake hydraulic pressure adjusting section 36 becomes equal to the second master cylinder pressure Pm.

In addition, a check valve CV5 which allows flow of the brake fluid in only one direction from the first port of the master cylinder MC to the upstream portion of the RR brake hydraulic pressure adjusting section 33 and the upstream portion of the FL brake hydraulic pressure adjusting section 34 is connected in parallel with the normally-open linear solenoid valve PC1. By virtue of this configuration, even during a period in which the actual differential pressure is controlled in accordance with the instruction current Id supplied to the normally-open linear solenoid valve PC1, when, upon operation of the brake pedal BP, the first master cylinder pressure Pm becomes higher than the pressure on the upstream side of the RR brake hydraulic pressure adjusting section 33 and the upstream portion of the FL brake hydraulic pressure adjusting section 34, brake hydraulic pressure (i.e., the first master cylinder pressure Pm) corresponding to the operation force of the brake pedal BP is supplied to the wheel cylinders Wrr and Wfl. Further, a check valve CV6, which provides the same function as does the check valve CV5, is connected in parallel with the normally-open linear solenoid valve PC2.

As is apparent from the above description, the brake hydraulic pressure control apparatus 30 is composed of two hydraulic circuit systems; i.e., a hydraulic circuit system regarding the rear right wheel RR and the front left wheel FL and a hydraulic circuit system regarding the rear left wheel RL and the front right wheel FR. The hydraulic pressure control apparatus 30 is configured such that when all the solenoid valves are in their unexcited states, brake hydraulic pressure (i.e., master cylinder pressure Pm) corresponding to the operation force of the brake pedal BP is supplied to the wheel cylinder W**.

Notably, the symbol "" appended to various variables and the like collectively represents the symbols fl, fr, rl, and rr and indicates that the particular variable or the like applies to all of the wheels FR, FL, etc. of the vehicle. For example, the wheel cylinder W collectively indicates the wheel cylinder Wfl for the front left wheel, the wheel cylinder Wfr for the front right wheel, the wheel cylinder Wrl for the rear left wheel, and the wheel cylinder Wrr for the rear right wheel.

Meanwhile, the hydraulic pressure control apparatus 30 is configured such that when the motor MT (accordingly, the hydraulic pumps HP1 and HP2) is driven and the normally-open linear solenoid valves PC1 and PC2 are excited by an instruction current Id in this state, brake hydraulic pressure which is higher than the master cylinder pressure Pm by an instruction differential pressure ΔPd determined in accordance with the instruction current Id can be supplied to the wheel cylinder W**.

In addition, the hydraulic pressure control apparatus 30 is configured such that the wheel cylinder pressure PW can be individually adjusted through control of the pressure-increasing valve PU and the pressure-reducing valve PD**. That is, the hydraulic pressure control apparatus 30 is configured to individually adjust the brake forces applied to the respective wheels independently of operation of the brake pedal BP by the driver.

Thus, the hydraulic pressure control apparatus 30 can achieve traction control, vehicle stabilization control (over-steer suppression control and under-steer suppression control), and idle-rotation suppression control, which will be described later, in accordance with an instruction from an electronic control apparatus 50.

Referring back to FIG. 1, the sensor section 40 includes electromagnetic-pickup-type wheel speed sensor 41*fl*, 41*fr*, 41*rl*, and 41*rr* which respectively output signals having frequencies corresponding to the respective rotational speeds of the wheels FL, FR, RL, and RR; an accelerator opening sensor 42 which detects an operated amount of an accelerator pedal AP operated by a driver and outputs a signal indicative of the operation mount Accp of the accelerator pedal AP; a master cylinder pressure sensor 43 (see FIG. 2) for detecting the (first) master cylinder pressure and outputs a signal indicative of the master cylinder pressure Pm; a lateral acceleration sensor 44 which detects a lateral acceleration of the vehicle and outputs a signal indicative of the lateral acceleration (actual lateral acceleration Gy); a yaw rate sensor 45 which detects a yaw rate of the vehicle and outputs a signal indicative of the yaw rate (actual yaw rate Yr); and a steering angle sensor 46 which detects a rotational angle of a steering wheel ST from its neutral position and outputs a signal indicative of the steering angle θs.

Further, the sensor section 40 includes a TCS switch 47 for selecting permission or prohibition of the above-mentioned traction control. Execution of the traction control is permitted when the TCS switch 47 is in an ON state, and is prohibited when the TCS switch 47 is in an OFF state.

The steering angle θs is zero when the steering wheel ST is located at the neutral position. The steering angle θs assumes a positive value when the steering wheel ST is turned counterclockwise (as viewed from a driver side), and assumes a negative value when the steering wheel ST is turned clockwise. Each of the actual lateral acceleration Gy and the actual yaw rate Yr assumes a positive value when the vehicle turns to the left (counterclockwise as viewed from the upper side of the vehicle), and assumes a negative value when the vehicle turns to the right.

The electronic control apparatus 50 is a microcomputer which includes a CPU 51; ROM 52 in which are previously stored routines (programs) to be executed by the CPU 51, tables (look-up tables and maps), constants, and the like; RAM 53 in which the CPU 51 temporarily stores data as necessary; backup RAM 54 which stores data when the power supply is on and which maintains the stored data when the power supply is cut off; an interface 55 containing A/D converters; and the like. The above components are interconnected via a bus. The interface 55 is connected to the sensors, etc. 41 to 47. The interface 55 supplies signals from the sensors, etc. 41 to 47 to the CPU 51. Further, in accordance with instructions from the CPU 51, the interface 55 outputs drive signals to the respective solenoid valves and the motor MT of t hydraulic pressure control apparatus 30, the throttle valve actuator 22, and the fuel injection apparatus 23.

By virtue of the above-described configuration, the throttle valve actuator 22 drives the throttle valve TH such that the opening TA of the throttle valve TH basically coincides with an opening corresponding to the operation amount Accp of the accelerator pedal AP; and the fuel injection apparatus 23 injects fuel of a quantity which is required to obtain a predetermined target air-fuel ratio (theoretical air-fuel ratio) for cylinder-interior intake air quantity, which is the quantity of air taken into each cylinder.

Further, the instruction currents Id (supply current) of the normally-open linear solenoid valves PC1 and PC2 are controlled by the CPU 51. Specifically, the CPU 51 adjusts the duty ratio of the supply current to thereby adjust the average (effective) current as the instruction current Id.

Outline of Respective Controls

Next, there will be described traction control, vehicle stabilization control (over-steer suppression control and under-steer suppression control), and idle-rotation suppression control (hereinafter may be referred to as "LSD control"), which are performed by the motion control apparatus 10 (hereafter may be referred to as "the present apparatus") according to the embodiment of the present invention having the above described configuration. The contents of the respective controls change depending on the state of the TCS switch 47. Therefore, the description is provided separately for the case where the TCS switch 47 is in an ON state and the case where the TCS switch 47 is in an OFF state.

Case where the TCS switch 47 is in an ON state:

<Traction Control>

Traction control is a control performed, when the vehicle is in a driven state, so as to prevent generation of excessive idle rotation (drive slip) of the wheels to thereby effectively generate traction. This traction control is executed only when the TCS switch 47 is in an ON state.

In accordance with the following Equation (1), the present apparatus calculates a slip ratio Sa for each wheel from an estimated vehicle body speed Vso estimated as described below and wheel speeds Vw respectively obtained from outputs of the wheel speed sensors 41**.

$$Sa^{}=(Vw^{}-Vso)/Vw^{**} \tag{1}$$

Figure 4:
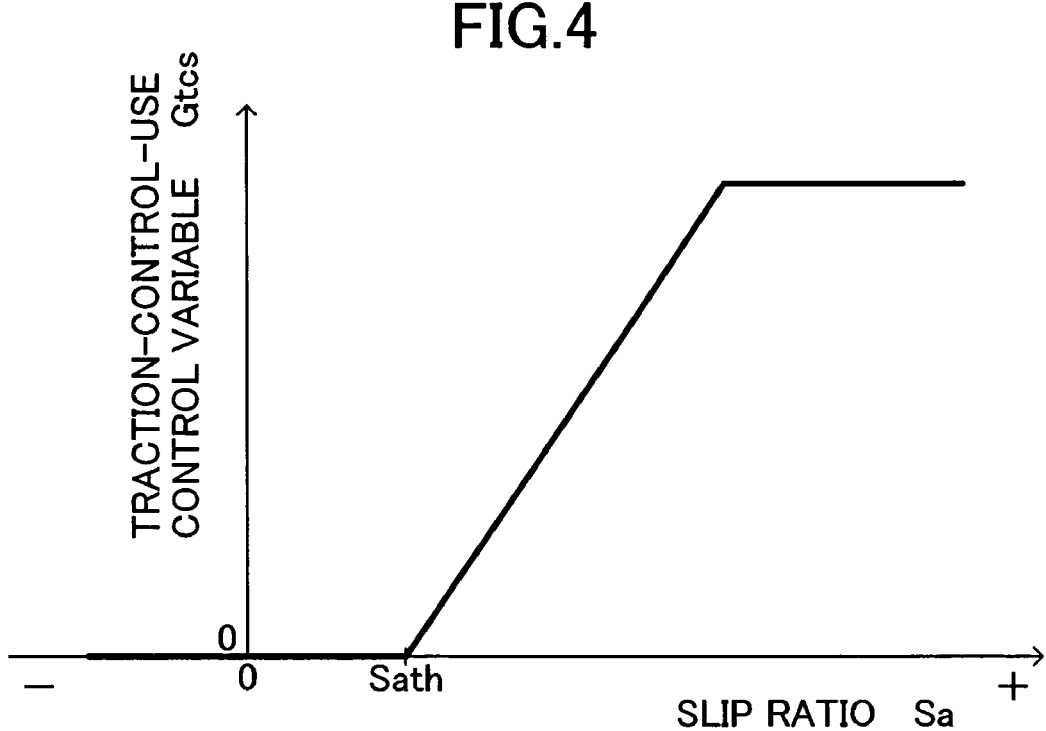
FIG. 4 is a graph showing a table which defines the relation between slip ratio and traction-control-use control value and to which the CPU shown in FIG. 1 refers.

The present apparatus obtains a traction-control-use control value Gtcs for each wheel on the basis of the slip ratio Sa and with reference to a previously prepared table MapGtcs, which defines the relation between the slip ratio Sa and the traction-control-use control value Gtcs shown in FIG. 4.

When a wheel whose traction-control-use control value Gtcs is greater than 0 is present (i.e., when a wheel whose slip ratio Sa exceeds the above-described allowable limit Sath(>0) is present), the present apparatus performs engine-output lowering control which lowers a predetermined amount the output of the engine 21 from a level corresponding to the accelerator pedal operation amount Accp.

The lowering amount of the engine output is determined in accordance with the maximum value of the traction-control-use control value Gtcs. That is, as can be understood from FIG. 4, the greater the maximum value of the slip ratio Sa, the greater the lowering amount of the engine output. This engine-output lowering control prevents generation of excessive idle rotation (drive slip) of the wheels. The above is the outline of the traction control.

<Vehicle Stabilization Control>

Vehicle stabilization control is a control which suppresses an over-steer state of the vehicle, if any, to thereby maintain the running stability of the vehicle, and suppresses any under-steer state of the vehicle to thereby maintain the turning-trace performance of the vehicle.

The present apparatus calculates a turning angle yaw rate Yrt based on the following Equation (2), which is based on the theoretical formula led from a motion model of the vehicle. This turning angle yaw rate Yrt is set such that when the vehicle is turning in the left direction (i.e., when the steering angle θs has a positive value) it becomes a positive value, and when the vehicle is turning in the right direction (i.e., when the steering angle θs has a negative value) it becomes a negative value. This theoretical formula is for calculating the theoretical value of the yaw rate when the vehicle is turning in a state where the steering angle and the vehicle body speed are both constant (at the time of steady circular turning).

$$Yrt=(Vso \cdot \theta s)/(n \cdot L) \cdot (1/(1+Kh \cdot Vso^2)) \quad (2)$$

In the above Equation (2), Vso is the above-mentioned estimated vehicle body speed, L is the wheel base of the vehicle, Kh is the stability factor, and n is the steering gear ratio. The wheel base 1, stability factor Kh, and steering gear ratio n are constants determined in accordance with the specifications of the vehicle.

Further, in accordance with the following Equation (3), the present apparatus calculates the yaw rate deviation $\Delta Yr$ (a value representing the degree of over-steer), which is a value obtained by subtracting the absolute value of the turning angle yaw rate Yrt from the absolute value of the actual yaw rate Yr that can be obtained by use of the yaw rate sensor 45.

$$\Delta Yr=|Yr|-|Yrt| \quad (3)$$

When the yaw rate deviation $\Delta Yr$ calculated with the above Equation (3) is a positive value, the vehicle is in a state where the turning radius is smaller than in a case where the turning angle yaw rate Yrt is assumed to be generated in the vehicle. The present apparatus determines that the vehicle is in an "over-steer state" when the yaw rate deviation $\Delta Yr$ is greater than a threshold value Yrth (>0).

Figure 5:
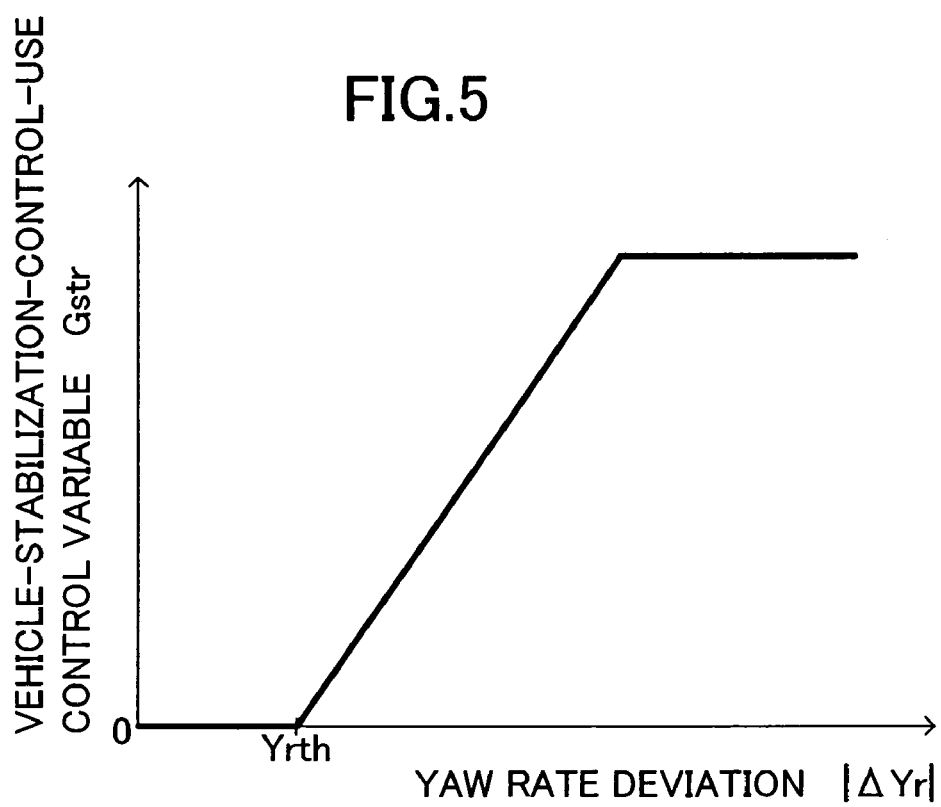
FIG. 5 is a graph showing a table which defines the relation between yaw rate deviation and vehicle-stabilization-control-use control value and to which the CPU shown in FIG. 1 refers.

The present apparatus executes vehicle stabilization control (over-steer suppression control) in order to suppress the over-steer state when it has determined that the vehicle is in an "over-steer state." Specifically, the present apparatus obtains a vehicle-stabilization-control-use control value Gstr on the basis of the absolute value of the yaw rate deviation $\Delta Yr$ and with reference to a previously prepared table MapGstr, which defines the relation between the absolute value of the yaw rate deviation $\Delta Yr$ and the vehicle-stabilization-control-use control value Gstr shown in FIG. 5.

The present apparatus then applies to the front wheel located on the outer side of a turning locus a braking force corresponding to the obtained vehicle-stabilization-control-use control value Gstr ($\neq 0$), by means of brake hydraulic pressure. As can be understood from FIG. 5, the greater the yaw rate deviation $\Delta Yr$ (>Yrth), the greater the braking force. As a result, a yawing moment is forcedly generated in the vehicle in a direction opposite the yawing direction. Accordingly, the absolute value of the actual yaw rate Yr decreases, so that the actual yaw rate Yr is controlled to approach the turning angle yaw rate Yrt. As a result, the running stability of the vehicle can be maintained.

When the yaw rate deviation $\Delta Yr$ calculated with the above Equation (3) is a negative value, the vehicle is in a state where the turning radius is larger than in a case where the turning angle yaw rate Yrt is assumed to be generated in the vehicle. The present apparatus determines that the vehicle is in an "under-steer state" when the yaw rate deviation $\Delta Yr$ is smaller than "-Yrth" (<0).

The present apparatus executes vehicle stabilization control (under-steer suppression control) in order to suppress the under-steer state when it has determined that the vehicle is in an "under-steer state." Specifically, as in the case of the above-described over-steer suppression control, the present apparatus obtains the vehicle-stabilization-control-use control value Gstr on the basis of the absolute value of the yaw rate deviation $\Delta Yr$ and with reference to the previously prepared table MapGstr shown in FIG. 5.

The present apparatus then applies to the rear wheel located on the inner side of the turning locus a braking force corresponding to the obtained vehicle-stabilization-control-use control value Gstr ($\neq 0$), by means of brake hydraulic pressure. As can be understood from FIG. 5, the greater the absolute value of the yaw rate deviation $\Delta Yr$ (<-Yrth), the greater the braking force. As a result, a yawing moment is forcedly generated in the vehicle in the same direction as the yawing direction. Accordingly, the absolute value of the actual yaw rate Yr increases, so that the actual yaw rate Yr is controlled to approach the turning angle yaw rate Yrt. As a result, the turning-trace performance of the vehicle can be maintained.

In the case of the vehicle-stabilization-control-use control value Gstr>0 (i.e., the absolute value $|\Delta Yr|$ of the yaw rate deviation>Yrth), irrespective of whether the vehicle is in an over-steer state or an under-steer state, the present apparatus performs, in addition to the above-mentioned application of braking force by means of brake hydraulic pressure, the engine-output lowering control which lowers a predetermined amount the output of the engine 21 from a level corresponding to the accelerator pedal operation amount Accp. As a result, centrifugal force acting on the vehicle decreases because of the lowered vehicle body speed, so that the running stability and turning-trace performance of the vehicle can be maintained. The above is the outline of the vehicle stabilization control for the case where the TCS switch 47 is in an ON state.

<LSD Control>

LSD control is a control which is executed when the vehicle is in a driven state so as to individually prevent generation of an excessive wheel speed difference between the left and right front wheels (driven wheels) and generation of an excessive wheel speed difference between the left and right rear wheels (driven wheels), to thereby secure the running performance and the escaping performance of the vehicle.

In accordance with the following Equations (4) and (5), the present apparatus obtains a front-wheel-side wheel speed difference $\Delta Vwf$ and a rear-wheel-side wheel speed difference $\Delta Vwr$ from the wheel speeds Vw respectively obtained from the outputs of the wheel speed sensors 41**\*\*.

$$\Delta Vwf=Vwfr-Vwfl \quad (4)$$

$$\Delta Vwr=Vwrr-Vwrl \quad (5)$$

Figure 6:
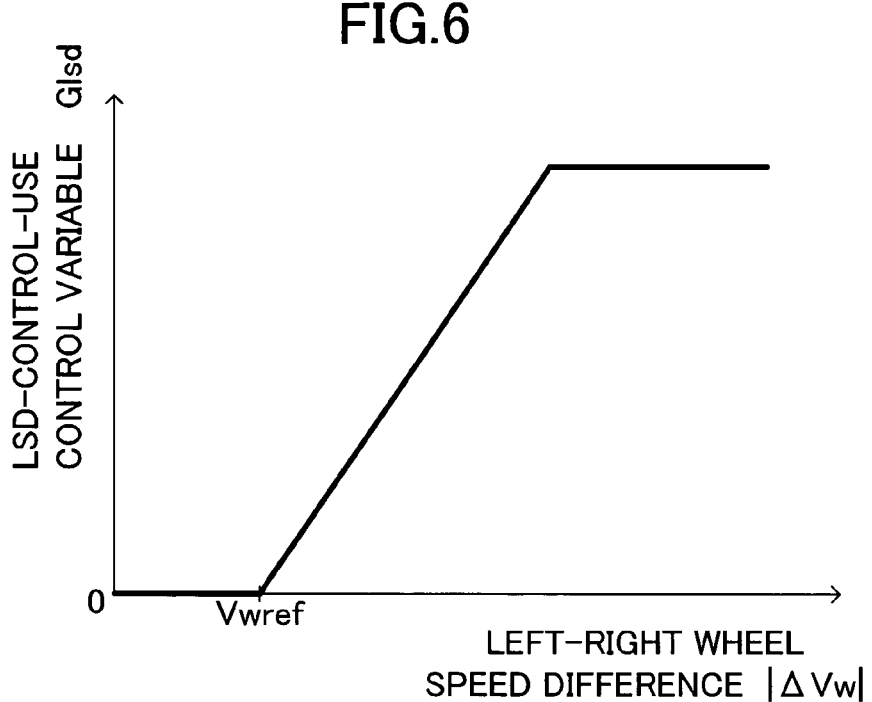
FIG. 6 is a graph showing a table which defines the relation between left-right wheel speed difference and LSD-control-use control value and to which the CPU shown in FIG. 1 refers.

The present apparatus obtains a front-wheel-LSD-control-use control value Glsdf and a rear-wheel-LSD-control-use control value Glsdr on the basis of the absolute value of the front-wheel-side wheel speed difference $\Delta Vwf$ and the absolute value of the rear-wheel-side wheel speed difference $\Delta Vwr$ and with reference to a previously prepared table MapGlsd, which defines the relation between the left-right wheel speed difference $\Delta Vw$ and the LSD-control-use control value Glsd shown in FIG. 6.

The present apparatus then applies to the one of the front wheels that has the higher wheel speed a braking force (braking force for suppressing front-wheel idle rotation) corresponding to the obtained front-wheel-LSD-control-use control value Glsdf ($\neq 0$), by means of brake hydraulic pressure. As can be understood from FIG. 6, the greater the absolute value of the front-wheel-side wheel speed difference $\Delta Vwf$, the greater the braking force. As a result, when the absolute value of the front-wheel-side wheel speed difference $\Delta Vwf$ exceeds an allowable limit Vwref (front-wheel-side allowable limit; see FIG. 6), a braking force is applied to the one of the front wheels whose wheel speed is higher, by means of brake hydraulic pressure, whereby sufficient distribution of the engine output (engine torque) to the front wheel whose wheel speed is lower is secured.

Similarly, the present apparatus applies to the one of the rear wheels whose wheel speed is higher a braking force (braking force for suppressing rear-wheel idle rotation) corresponding to the obtained rear-wheel-LSD-control-use control value Glsdr ($\neq 0$), by means of brake hydraulic pressure. As can be understood from FIG. 6, the greater the absolute value of the rear-wheel-side wheel speed difference $\Delta$Vwr, the greater the braking force. As a result, when the absolute value of the rear-wheel-side wheel speed difference $\Delta$Vwr exceeds the above-mentioned allowable limit Vwref (rear-wheel-side allowable limit; see FIG. 6), a braking force is applied to the one of the rear wheels whose wheel speed is higher, by means of brake hydraulic pressure, whereby sufficient distribution of the engine output (engine torque) to the rear wheel whose wheel speed is lower is secured.

In this manner, the running performance and the escaping performance of the vehicle are secured. The above is the outline of the LSD control for the case where the TCS switch 47 is in an ON state. In the above, the outline of the respective controls (traction control, vehicle stabilization control, and LSD control) for the case where the TCS switch 47 is in an ON state have been described.

Case where the TCS Switch 47 is in an OFF State:

Next, the outline of vehicle stabilization control and LSD control for the case where the TCS switch 47 is in an OFF state will be successively described. In this case, as described above, traction control is not performed.

<Vehicle Stabilization Control>

The vehicle stabilization control for the case where the TCS switch 47 is in an OFF state differs from the vehicle stabilization control for the case where the TCS switch 47 is in an ON state, only in that the above-described "engine-output lowering control" is not performed. Accordingly, description of the outline of the vehicle stabilization control for the case where the TCS switch 47 is in an OFF state is omitted.

<LSD Control>

The LSD control for the case where the TCS switch 47 is in an OFF state differs from the LSD control for the case where the TCS switch 47 is in an ON state only in that instead of the absolute value of the front-wheel-side wheel speed difference $\Delta$Vwf obtained in accordance with the above-mentioned Equation (4), a control-use front-wheel-side wheel speed difference $\Delta$Vwfs to be described later is used as the left-right wheel speed difference $|\Delta$Vw$|$, which is used to obtain the front-wheel-LSD-control-use control value Glsdf with reference to the table MapGlsd shown in FIG. 6. This difference will now be described.

Figure 7:
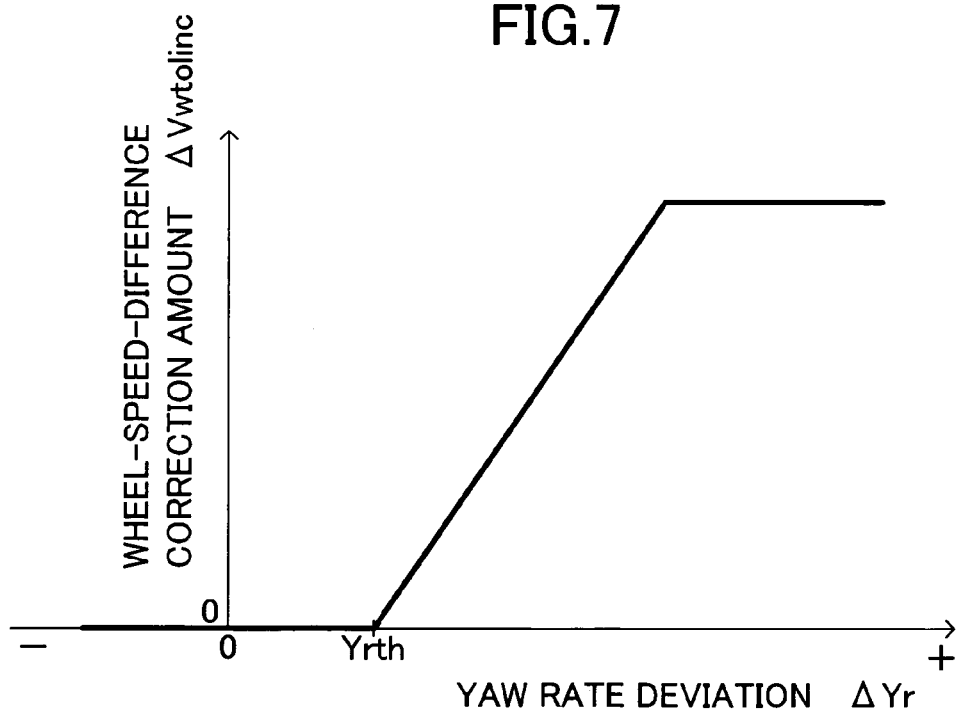
FIG. 7 is a graph showing a table which defines the relation between yaw rate deviation and wheel-speed-difference correction amount and to which the CPU shown in FIG. 1 refers.

When the TCS switch 47 is in an OFF state, the present apparatus obtains a wheel-speed-difference correction amount $\Delta$Vwtolinc ($\geq 0$) on the basis of the yaw rate deviation $\Delta$Yr and with reference to a previously prepared table Map$\Delta$Vwtolinc which defines the relation between the yaw rate deviation $\Delta$Yr and the wheel-speed-difference correction amount $\Delta$Vwtolinc shown in FIG. 7.

With this operation, when the yaw rate deviation $\Delta$Yr is equal to or less than a threshold value Yrth, which is the same as the threshold value Yrth of FIG. 5 (i.e., when the over-steer suppression control is not performed), the wheel-speed-difference correction amount $\Delta$Vwtolinc is maintained at zero; and when the yaw rate deviation $\Delta$Yr is greater than the threshold value Yrth (i.e., when the over-steer suppression control is executed), the greater the yaw rate deviation $\Delta$Yr, the greater the value (>0) of the wheel-speed-difference correction amount $\Delta$Vwtolinc.

Further, the present apparatus obtains the control-use front-wheel-side wheel speed difference $\Delta$Vwfs ($\geq 0$) in accordance with the following Equation (6). With this, the control-use front-wheel-side wheel speed difference $\Delta$Vwfs assumes a value equal to the absolute value of the front-wheel-side wheel speed difference $\Delta$Vwf when the over-steer suppression control is not performed, and is set to a value smaller than the front-wheel-side wheel speed difference $\Delta$Vwf such that the greater the yaw rate deviation $\Delta$Yr (>Yrth), the smaller the value when the over-steer suppression control is executed.

$$\Delta Vwfs = |\Delta Vwf| - \Delta Vwtolinc \qquad (6)$$

The present apparatus obtains the front-wheel-LSD-control-use control value Glsdf from the control-use front-wheel-side wheel speed difference $\Delta$Vwfs obtained in accordance with Equation (6), and with reference to the table MapGlsd shown in FIG. 6. As a result, in the case where the over-steer suppression control is executed, unlike the case where the over-steer suppression control is not executed, the front-wheel-LSD-control-use control value Glsdf (accordingly, braking force for suppressing front-wheel idle rotation) is set such that the greater the yaw rate deviation $\Delta$Yr (>Yrth), the smaller the value, despite reference being made to the same table MapGlsd.

As a result, in the case where the over-steer suppression control is executed, the (front-wheel-side) allowable limit Vwref in the table shown in FIG. 6 apparently increases by an amount corresponding to the wheel-speed-difference correction amount $\Delta$Vwtolinc.

As a result, in the case where the TCS switch 47 is in an OFF state, even when the LSD control is executed simultaneously with the over-steer suppression control (vehicle stabilization control), the running stability of the vehicle is securely maintained.

Figure 8:
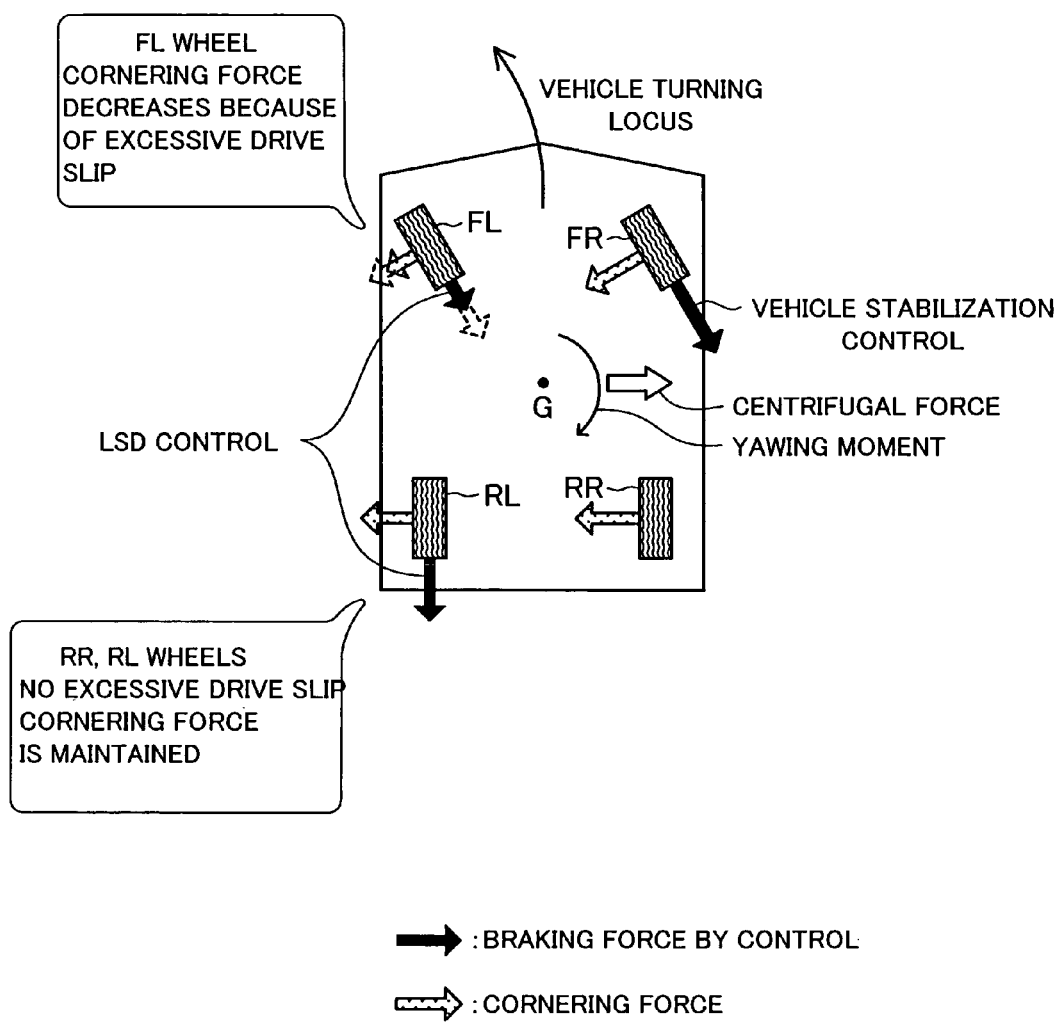
FIG. 8 shows an example control performed by the motion control apparatus shown in FIG. 1 for the case where vehicle stabilization control (over-steer suppression control) and LSD control are simultaneously performed.

This will now be described with reference to FIG. 8. FIG. 8 shows an example control which the present apparatus performs in the case where the four-wheel drive vehicle with the TCS switch 47 being OFF is running in mud while turning leftward. This example is explained under the assumption that a driver demands a higher engine output when the over-steer suppression control is executed because the vehicle is in an over-steer state.

In this case, since the TCS switch 47 is in an OFF state, the traction control is not performed. Further, the above-described engine-output lowering control is not performed in the over-steer suppression control.

In this case, as shown in FIG. 8, a braking force produced by means of the over-steer suppression control is imparted to the front right wheel FR, which is the front wheel located on the outer side of the turning locus. Accordingly, the high engine output is mainly distributed to the three wheels other than the front right wheel FR.

When excessive engine output is distributed to the front left wheel FL, which is the front wheel located on the inner side of the turning locus, the front left wheel FL becomes likely to start excessive idle rotation (drive slip). As a result, through the LSD control, a braking force for suppressing front-wheel idle rotation is applied to the front left wheel FL, which is the front wheel whose wheel speed is higher.

However, in this case, the braking force for suppressing front-wheel idle rotation has been reduced as described above. Therefore, the front left wheel FL is intentionally permitted to produce excessive idle rotation. Accordingly, since the cornering force generated by means of the tire of the front left wheel FL decreases, the total sum of the cornering forces generated by means of the tires of the two front wheels also decreases.

Meanwhile, when the front left wheel FL produces excessive idle rotation, surplus engine output is consumed by the excessive idle rotation of the front left wheel FL, and as a result, excessive engine output becomes unlikely to be distributed to the two rear wheels. Accordingly, the two rear wheels become unlikely to produce excessive idle rotation.

In this case, the wheel is turning to the left, because of the action of centrifugal force acting on the vehicle, the load imposed on the rear left wheel RL, which is the wheel located on the inner side of the turning locus, decreases. Accordingly, the rear left wheel RL becomes more likely to generate idle rotation (drive slip) as compared with the rear right wheel RR. The example shows a case in which the rear left wheel RL starts idle rotation, and thus, by means of the LSD control, a braking force for suppressing rear-wheel idle rotation is applied to the rear left wheel RL, which is the rear wheel of higher wheel speed.

The braking force for suppressing rear-wheel idle rotation is set to a proper braking force for preventing generation of an excessive wheel speed difference between the left and right rear wheels (accordingly, for preventing generation of excessive idle rotation of the rear left wheel RL). Accordingly, generation of excessive idle rotation of the rear left wheel RL is prevented, and as a result, the two rear wheels do not produce excessive idle rotation. Thus, the total sum of the cornering forces generated by means of the tires of the two rear wheels can be maintained.

When the cornering force generated by means of tires of the two front wheels decrease with the cornering force generated by means of tires of the two rear wheels maintained, a yawing moment of a direction opposite the vehicle's yawing direction is generated in the vehicle (see FIG. 8). This yawing moment is generated in the same direction as that of the yawing moment generated by means of the above-described over-steer suppression control.

Accordingly, the over-steer suppressing effect by the over-steer suppression control can be reliably maintained. That is, when the TCS switch 47 is in an OFF state, even when the LSD control is executed simultaneously with execution of the over-steer suppression control, the running stability of the vehicle can be reliably maintained.

In addition, in this case, because of the TCS switch 47 being in an OFF state, the engine-output lowering control is not performed by means of the over-steer suppression control, and at least the two rear wheels which do not produce excessive idle rotation can generate sufficient traction. Therefore, the running performance and the escaping performance of the vehicle can be secured.

That is, when the driver brings the TCS switch 47 into an OFF state, the running performance and the escaping performance of the vehicle can be secured and the running stability of the vehicle can be reliably maintained, for example, in the case where the vehicle runs through mud as described above. The above is the outline of the respective controls (vehicle stabilization control and LSD control) for the case where the TCS switch 47 is in an OFF state.

Actual Operation

Next, the actual operation of the motion control apparatus 10 according to the embodiment of the present invention configured as described above will be explained with reference to FIGS. 9 through 13, which show routines executed by the CPU 51 of the electronic control apparatus 50 in the form of flowcharts. Hereafter, for the sake of convenience of explanation, the operation for the case where the driver has set the TCS switch 47 to an ON state, will first be explained.

<Case where the TCS Switch 47 is in an ON State>

Figure 9:
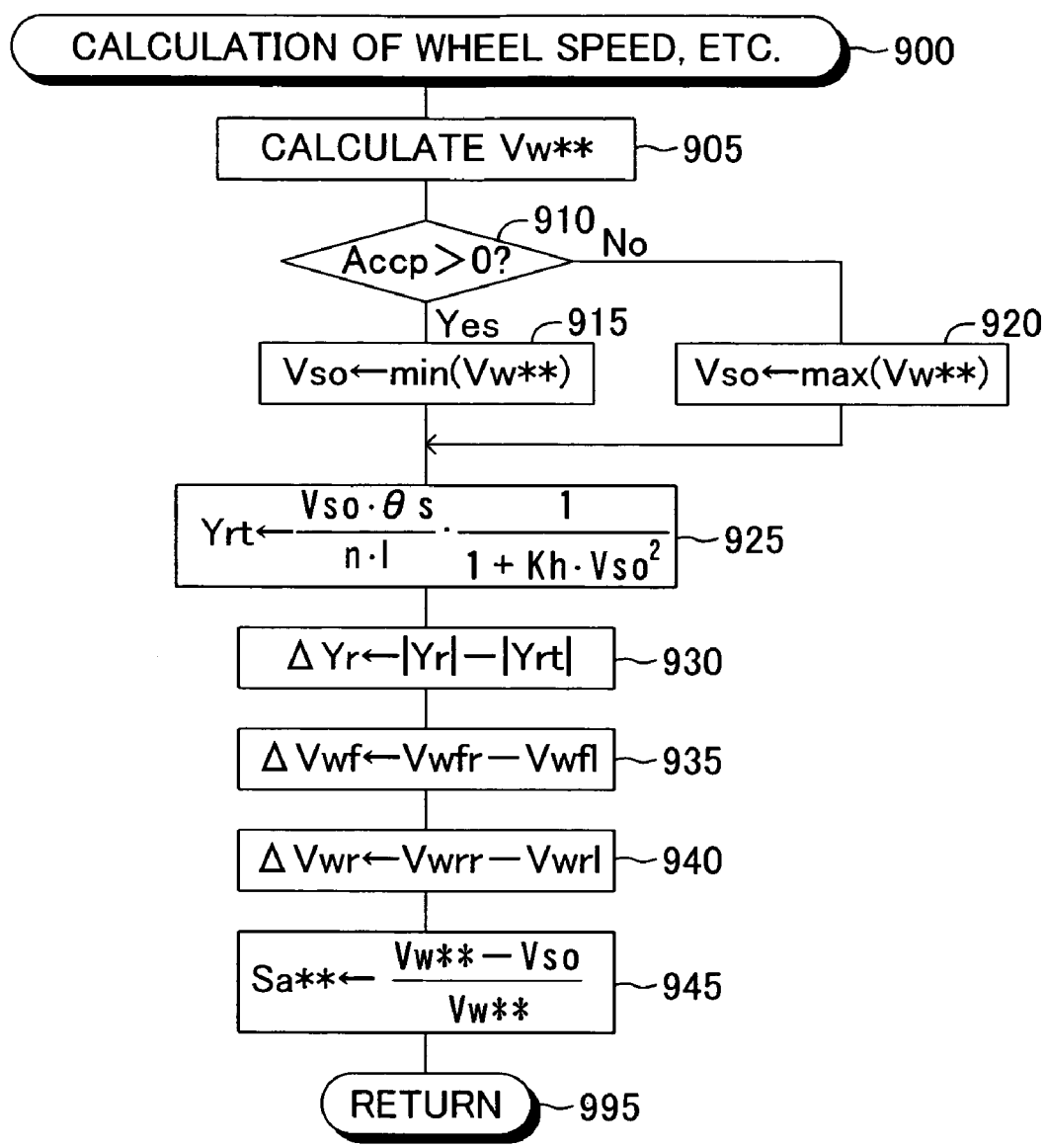

The CPU 51 repeatedly executes a routine shown in FIG. 9 for calculation of wheel speeds, etc. every time a predetermined time (execution interval $\Delta t$: e.g., 6 msec) elapses. Accordingly, when a predetermined timing has come, the CPU 51 initiates the processing from step 900 and proceeds to step 905 so as to respectively calculate present wheel speeds (outer circumferential speeds) $Vw^{}$ of the wheels. Specifically, the CPU 51 respectively calculates the wheel speeds $Vw^{}$ on the basis of the fluctuation frequencies of the output values of the wheel speed sensors $41^{}$.

Next, the CPU 51 proceeds to step 910 and determines whether the accelerator pedal operation amount Accp obtained from the accelerator opening sensor 42 is greater than "0" (that is, whether the vehicle is in a driven state). When the CPU 51 makes a "Yes" determination (when the vehicle is in a driven state), it proceeds to step 915 so as to select the smallest value from the wheel speeds $Vw^{}$ as the estimated vehicle body speed Vso. On the other hand, when the CPU 51 makes a "No" determination (when the vehicle is in a braked state), it proceeds to step 920 so as to select the largest value from the wheel speeds $Vw^{}$ as the estimated vehicle body speed Vso.

Next, the CPU 51 proceeds to step 925 so as to calculate the turning angle yaw rate Yrt from the estimated vehicle body speed Vso calculated in the above-mentioned step 915 or 920, the steering angle θs obtained from the steering angle sensor 46, and the above-described Equation (2), Subsequently, the CPU 51 proceeds to step 930 so as to calculate the yaw rate deviation ΔYr on the basis of the actual yaw rate Yr obtained from the yaw rate sensor 45, the turning angle yaw rate Yrt calculated in the above-described step 925, and the above-described Equation (3).

Next, the CPU 51 proceeds to step 935 so as to obtain the front-wheel-side wheel speed difference ΔVwf on the basis of the wheel speeds Vwf* calculated in step 905 and the above-described Equation (4), and then proceeds to step 940 so as to obtain the rear-wheel-side wheel speed difference ΔVwr on the basis of the wheel speeds Vwr* calculated in step 905 and the above-described Equation (5).

Next, the CPU 51 proceeds to step 945 so as to obtain the slip ration $Sa^{}$ for each wheel on the basis of the wheel speed $Vw^{}$ and the above-described Equation (1), and then proceeds to step 995 so as to end the current execution of the present routine. After that, the CPU 51 updates the respective values by repeatedly executing the present routine at the execution time intervals $\Delta t$.

Figure 10:
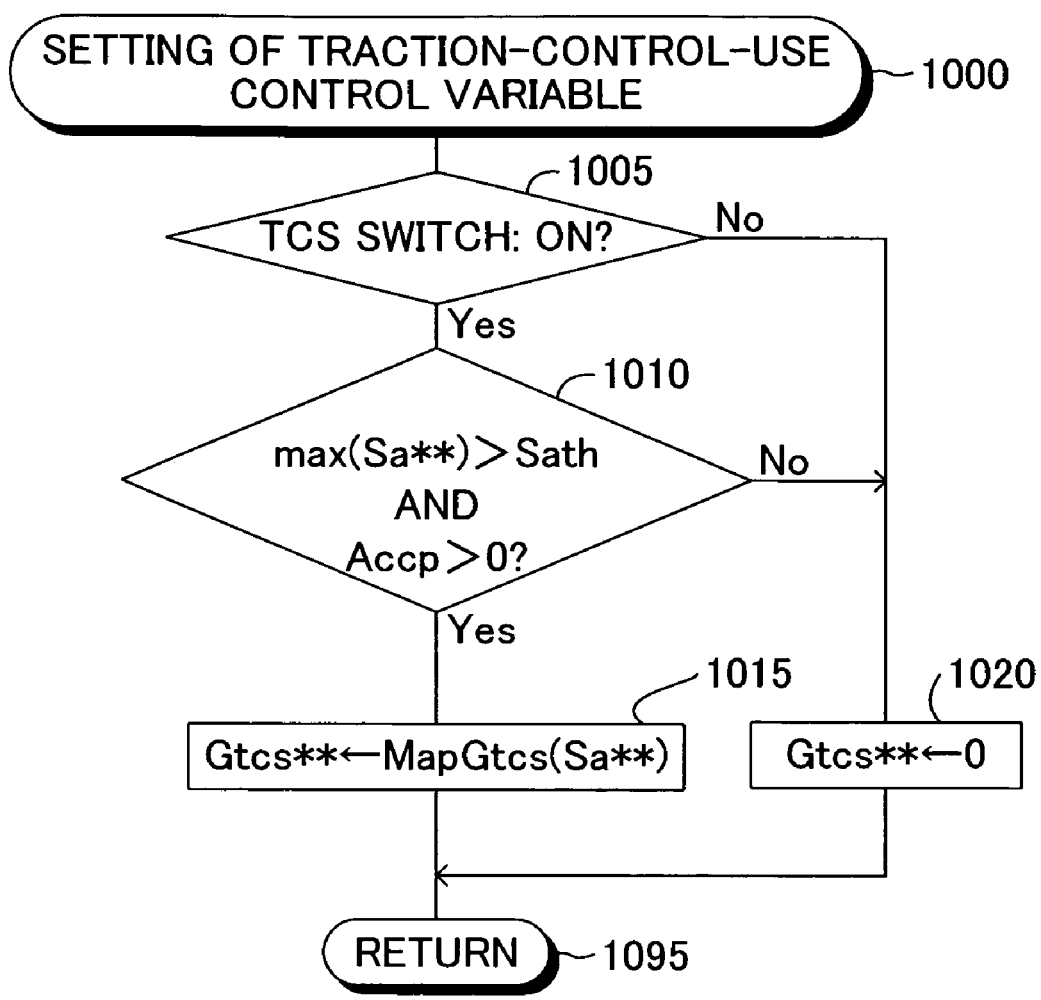
FIG. 10 is a flowchart showing a routine executed by the CPU shown in FIG. 1 for setting a traction-control-use control value.

Further, the CPU 51 repeatedly executes a routine shown in FIG. 10 for setting the traction-control-use control value every time a predetermined time (e.g., 6 msec) elapses. Accordingly, when a predetermined timing has come, the CPU 51 initiates the processing from step 1000 and proceeds to step 1005 so as to determine whether the TCS switch 47 is in an ON state.

Since the TCS switch 47 is in an ON state at the present point in time, the CPU 51 makes a "Yes" determination in step 1005, and then proceeds to step 1010 so as to determine whether the maximum value of the slip ratio $Sa^{}$ calculated in the previously described step 945 is greater than the above-mentioned allowable limit Sath (see FIG. 4) and the accelerator pedal operation amount Accp obtained from the accelerator opening sensor 42** is greater than "0" (i.e., the vehicle is in a driven state).

When the CPU 51 makes a "Yes" determination, it proceeds to step 1015 so as to obtain the traction-control-use control value Gtcs for each wheel on the basis of the slip ratio Sa and with reference to the table MapGtcs shown in FIG. 4. Subsequently, the CPU 51 proceeds to step 1095 so as to end the current execution of the present routine.

With this operation, the traction-control-use control value Gtcs of a wheel(s) whose slip ratio Sa is equal to or less than the allowable limit Sath is set to "0," and the traction-control-use control value Gtcs of a wheel(s) whose slip ratio Sa is greater than the allowable limit Sath is set to a value (>0) corresponding to the slip ratio Sa.

Meanwhile when the slip ratios Sa of all the wheels are equal to or lower than the allowable limit Sath, the CPU 51 makes a "No" determination in step 1010, and then proceeds to step 1020 so as to set the traction-control-use control values Gtcs of all the wheels to "0." Subsequently, the CPU 51 proceeds to step 1095** so as to end the current execution of the present routine.

Figure 11:
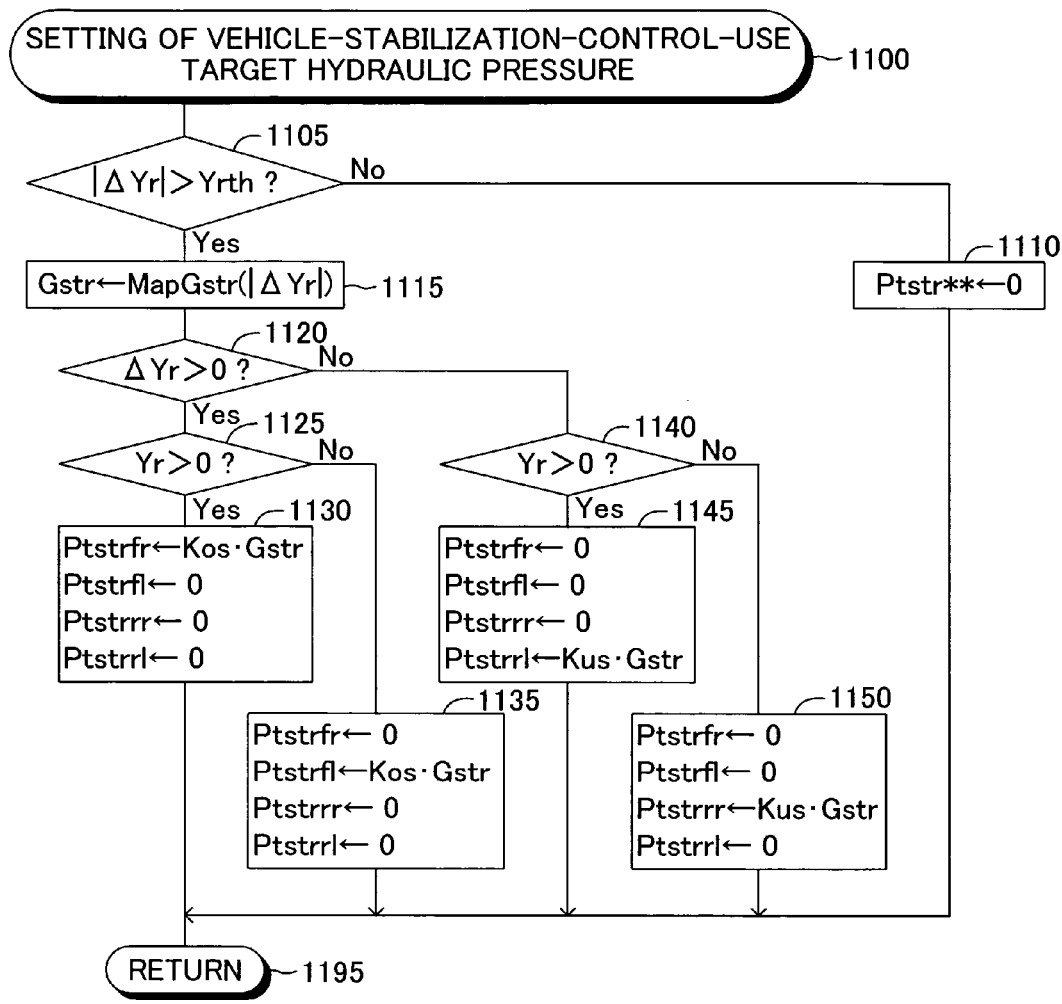
FIG. 11 is a flowchart showing a routine executed by the CPU shown in FIG. 1 for setting a target hydraulic pressure for vehicle stabilization control.

Further, the CPU 51 repeatedly executes a routine shown in FIG. 11 for setting the target hydraulic pressure for vehicle stabilization control every time a predetermined time (e.g., 6 msec) elapses. Accordingly, when a predetermined timing has come, the CPU 51 initiates the processing from step 1100 and proceeds to step 1105 so as to determine whether the absolute value of the yaw rate deviation $\Delta Yr$ calculated in the previously described step 930 is greater than the threshold value Yrth. When the CPU 51 makes a "No" determination (i.e., when the vehicle is neither in an over-steer state nor in an under-steer state), it proceeds to step 1110 so as to set the vehicle-stabilization-control-use target hydraulic pressures Ptstr for all the wheels to "0." Subsequently, the CPU 51 proceeds directly to step 1195** so as to end the current execution of the present routine.

Here, the absolute value of the yaw rate deviation $\Delta Yr$ is assumed to be greater than the threshold value Yrth (i.e., the vehicle is assumed to be in an over-steer state or an under-steer state). In this case, the CPU 51 makes a "Yes" determination in step 1105, and then proceeds to step 1115 so as to obtain the vehicle-stabilization-control-use control value Gstr on the basis of the absolute value of the yaw rate deviation $\Delta Yr$ and with reference to the table MapGstr shown in FIG. 5.

Subsequently, the CPU 51 proceeds to step 1120 so as to determine whether the yaw rate deviation $\Delta Yr$ is positive (i.e., greater than the threshold value Yrth). Here, the yaw rate deviation $\Delta Yr$ is assumed to be positive (that is, the vehicle is assumed to be in an over-steer state). In this case, the CPU 51 makes a "Yes" determination in step 1120, and then proceeds to step 1125 so as to determine whether the actual yaw rate Yr obtained from the yaw rate sensor 45 is positive (i.e., the turning direction is leftward or rightward).

When the vehicle is turning to the left, the CPU 51 makes a "Yes" determination in step 1125, and then proceeds to step 1130 so as to set the vehicle-stabilization-control-use target hydraulic pressure Ptstrfr for the front right wheel FR (the front wheel located on the outer side of the turning locus) to a value obtained by multiplying the obtained vehicle-stabilization-control-use control value Gstr by a coefficient Kos (positive constant) for over-steer suppression control, and set the vehicle-stabilization-control-use target hydraulic pressure Ptstr for the remaining three wheels to "0." Subsequently, the CPU 51 proceeds to step 1195** so as to end the current execution of the present routine.

Meanwhile, when the vehicle is turning to the right, the CPU 51 makes a "No" determination in step 1125, and then proceeds to step 1135 so as to set the vehicle-stabilization-control-use target hydraulic pressure Ptstrfl for the front left wheel FL (the front wheel located on the outer side of the turning locus) to a value obtained by multiplying the obtained vehicle-stabilization-control-use control value Gstr by the coefficient Kos for over-steer suppression control, and set the vehicle-stabilization-control-use target hydraulic pressure Ptstr** for the remaining three wheels to "0." With this operation, the target hydraulic pressure Ptstrf* for the front wheel located on the outer side of the turning locus is set to a value (>0) corresponding to the yaw rate deviation $\Delta Yr$.

Meanwhile, when the yaw rate deviation $\Delta Yr$ is assumed to be negative (i.e., smaller than "−Yrth") (that is, the vehicle is assumed to be in an under-steer state), the CPU 51 makes a "No" determination in step 1120, and then proceeds to step 1140 so as to make the same determination as in the previously described step 1125.

When the vehicle is turning to the left, the CPU 51 makes a "Yes" determination in step 1140, and then proceeds to step 1145 so as to set the vehicle-stabilization-control-use target hydraulic pressure Ptstrrl for the rear left wheel RL (the rear wheel located on the inner side of the turning locus) to a value obtained by multiplying the obtained vehicle-stabilization-control-use control value Gstr by a coefficient Kus (positive constant) for under-steer suppression control, and set the vehicle-stabilization-control-use target hydraulic pressure Ptstr** for the remaining three wheels to "0."

Meanwhile, when the vehicle is turning to the right, the CPU 51 makes a "No" determination in step 1140, and then proceeds to step 1150 so as to set the vehicle-stabilization-control-use target hydraulic pressure Ptstrrr for the rear right wheel RR (the rear wheel located on the inner side of the turning locus) to a value obtained by multiplying the obtained vehicle-stabilization-control-use control value Gstr by the coefficient Kus for under-steer suppression control, and set the vehicle-stabilization-control-use target hydraulic pressure Ptstrr* for the remaining three wheels to "0." With this operation, the target hydraulic pressure Ptstrr* for the rear wheel located on the inner side of the turning locus is set to a value (>0) corresponding to the absolute value of the yaw rate deviation $\Delta Yr$.

Figure 12:
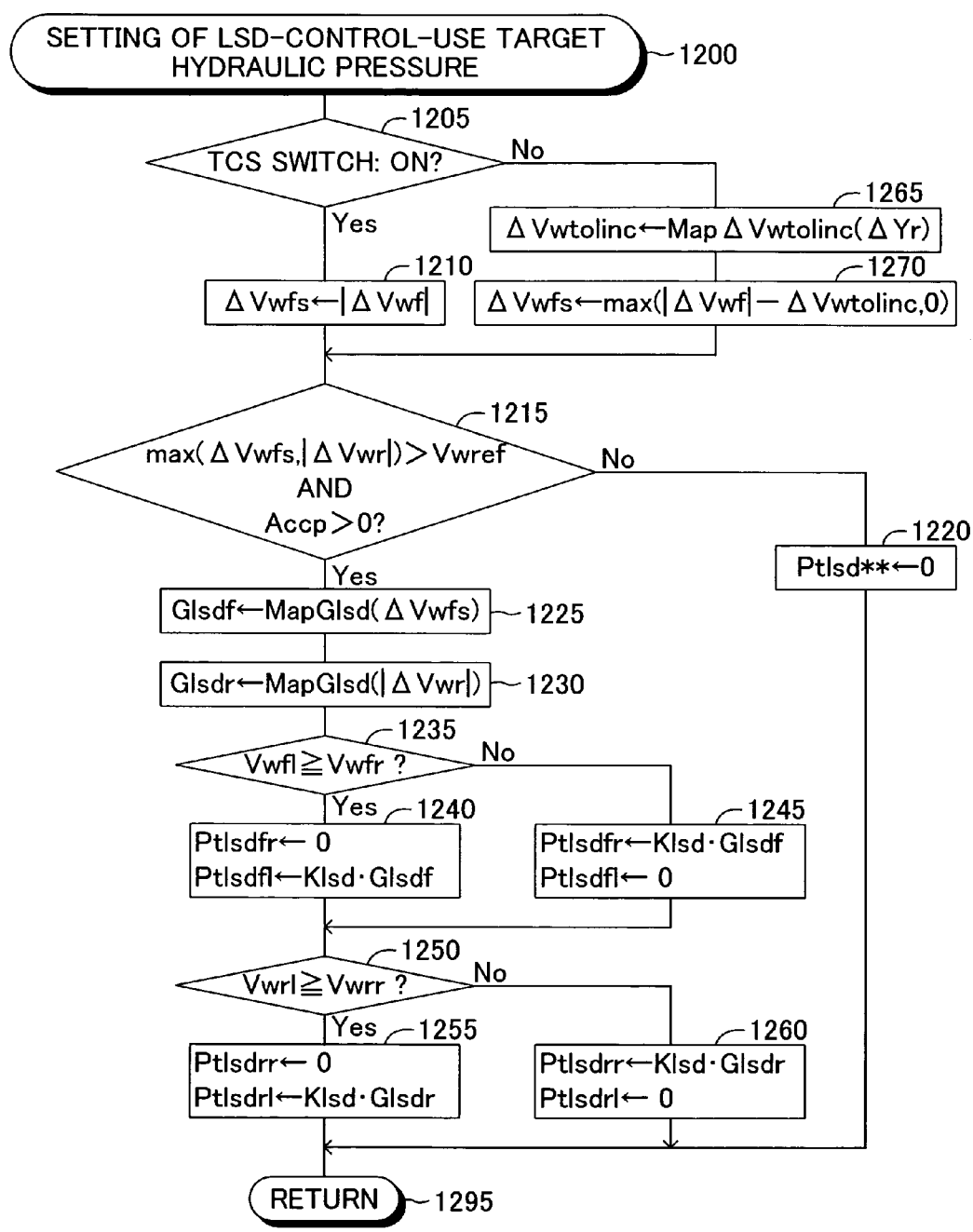
FIG. 12 is a flowchart showing a routine executed by the CPU shown in FIG. 1 for setting a target hydraulic pressure for LSD control.

Further, the CPU 51 repeatedly executes a routine shown in FIG. 12 for setting the LSD-control-use control value every time a predetermined time (e.g., 6 msec) elapses. Accordingly, when a predetermined timing has come, the CPU 51 initiates the processing from step 1200 and proceeds to step 1205 so as to determine whether the TCS switch 47 is in an ON state.

Since the TCS switch 47 is in an ON state at the present point in time, the CPU 51 makes a "Yes" determination in step 1205, and then proceeds to step 1210 so as to set the control-use front-wheel-side wheel speed difference $\Delta Vwfs$ to a value equal to the absolute value of the front-wheel-side wheel speed difference $\Delta Vwf$ calculated in the previously described step 935.

Subsequently, the CPU 51 proceeds to step 1215 so as to determine whether greater one of the control-use front-wheel-side wheel speed difference $\Delta Vwfs$ ($=|\Delta Vwf|$) and the absolute value $|\Delta Vwr|$ of the rear-wheel-side wheel speed difference calculated in the previously described step 940 is greater than the above-mentioned allowable limit Vwref (front-wheel-side allowable limit, rear-wheel-side allowable limit), and the accelerator pedal operation amount Accp is greater than "0" (that is, the vehicle is in a driven state).

When the CPU 51 makes a "No" determination, it proceeds to step 1220 so as to set the LSD-control-use target hydraulic pressures Ptlsd for all the wheels to "0," and then proceeds directly to step 1295** so as to end the current execution of the present routine.

Meanwhile, when the CPU 51 makes a "Yes" determination in step 1215, it proceeds to step 1225 so as to obtain the front-wheel-LSD-control-use control value Glsdf on the basis of the control-use front-wheel-side wheel speed difference ΔVwfs (=|ΔVwfl|) and with reference to the table MapGlsd shown in FIG. 6, and then proceeds to step 1230 so as to obtain the rear-wheel-LSD-control-use control value Glsdr on the basis of the absolute value |ΔVwr| of the rear-wheel-side wheel speed difference and with reference to the table MapGlsd shown in FIG. 6.

Subsequently, the CPU 51 proceeds to step 1235 so as to determine whether the wheel speed Vwfl is not less than the wheel speed Vwfr. When the CPU 51 makes a "Yes" determination, it proceeds to step 1240 so as to set the LSD-control-use target hydraulic pressure Ptlsdfl for the front left wheel FL to a value obtained by multiplying the obtained front-wheel-LSD-control-use control value Glsdf by a coefficient Klsd (positive constant) for LSD control, and set the LSD-control-use target hydraulic pressure Ptlsdfr for the front right wheel FR to "0."

Meanwhile, when the CPU 51 makes a "No" determination in step 1235, it proceeds to step 1245 so as to set the LSD-control-use target hydraulic pressure Ptlsdfr for the front right wheel FR to a value obtained by multiplying the obtained front-wheel-LSD-control-use control value Glsdf by the coefficient Klsd for LSD control, and set the LSD-control-use target hydraulic pressure Ptlsdfl for the front left wheel FL to "0."

Subsequently, the CPU 51 proceeds to step 1250 so as to determine whether the wheel speed Vwrl is not less than the wheel speed Vwrr. When the CPU 51 makes a "Yes" determination, it proceeds to step 1255 so as to set the LSD-control-use target hydraulic pressure Ptlsdrl for the rear left wheel RL to a value obtained by multiplying the obtained rear-wheel-LSD-control-use control value Glsdr by the coefficient Klsd for LSD control, and set the LSD-control-use target hydraulic pressure Ptlsdrr for the rear right wheel RR to "0."

Meanwhile, when the CPU 51 makes a "No" determination in step 1250, it proceeds to step 1260 so as to set the LSD-control-use target hydraulic pressure Ptlsdrr for the rear right wheel RR to a value obtained by multiplying the obtained rear-wheel-LSD-control-use control value Glsdr by the coefficient Klsd for LSD control, and set the LSD-control-use target hydraulic pressure Ptlsdrl for the rear left wheel RL to "0." Subsequently, the CPU 51 proceeds to step 1295 so as to end the current execution of the present routine.

Figure 13:
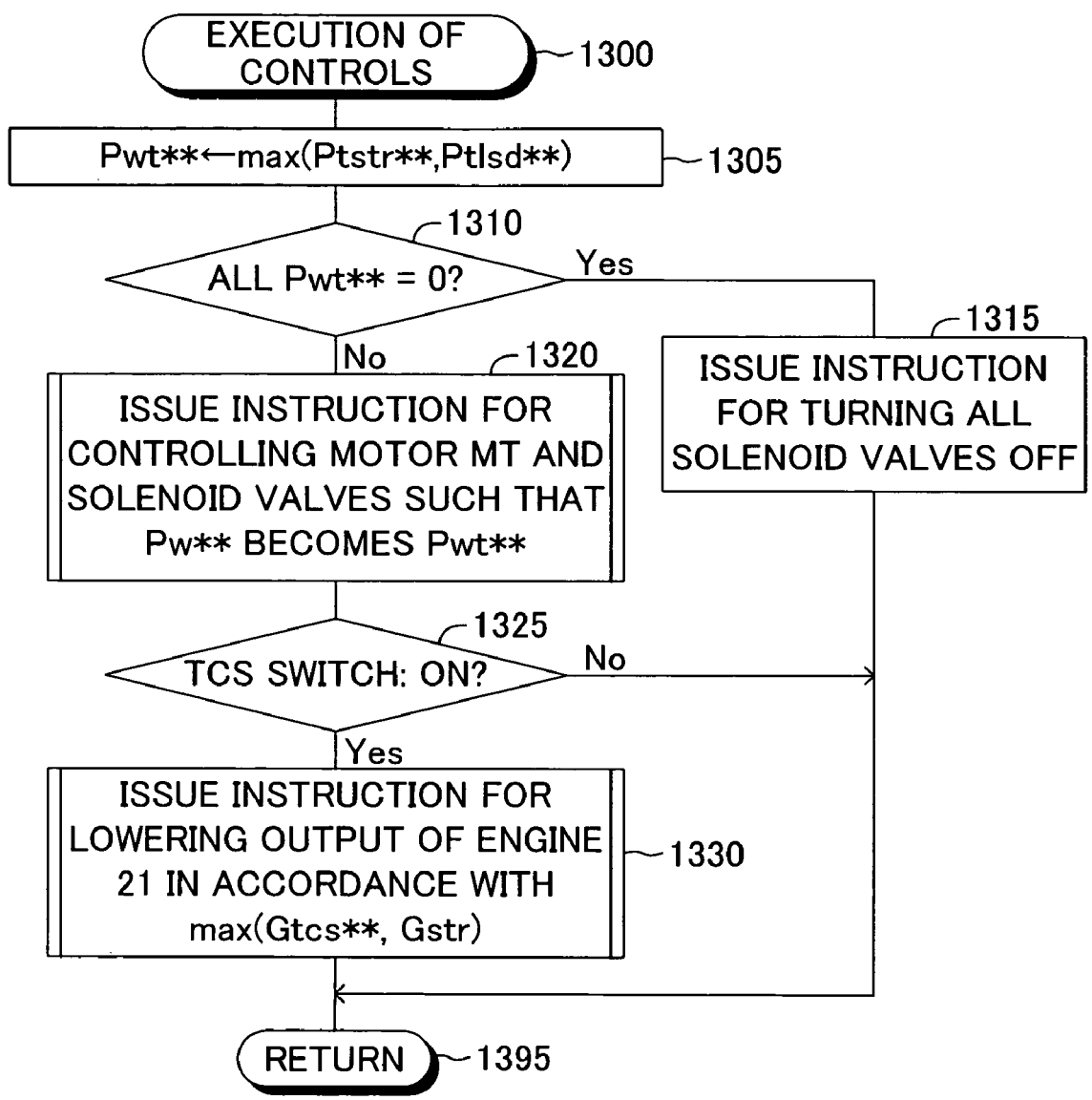
FIG. 13 is a flowchart showing a routine executed by the CPU shown in FIG. 1 for performing various controls.

Further, the CPU 51 repeatedly executes a routine shown in FIG. 13 for execution of the various controls every time a predetermined time (e.g., 6 msec) elapses. Accordingly, when a predetermined timing has come, the CPU 51 initiates the processing from step 1300 and proceeds to step 1305 so as to set the final target hydraulic pressure Pwt for each wheel to greater one of the vehicle-stabilization-control-use target hydraulic pressure Ptstr and the LSD-control-use target hydraulic pressure Ptlsd, which are respectively set through execution of the routines of FIGS. 11 and 12**.

Subsequently, the CPU 51 proceeds to step 1310 so as to determine whether the final target hydraulic pressures Pwt for all the wheels are "0." When the CPU 51 makes a "Yes" determination, it proceeds to step 1315 and issues an instruction for bringing all the solenoid valves of the hydraulic pressure control apparatus 30 (see FIG. 2) into an unexcited state and bringing the motor MT into an inactivated state. Subsequently, the CPU 51 proceeds directly to step 1395** so as to end the current execution of the present routine.

Meanwhile, when the CPU 51 makes a "No" determination in step 1310, it proceeds to step 1320 and issues an instruction for controlling the motor MT and the solenoid valves of the hydraulic pressure control apparatus 30 such that the wheel cylinder pressure Pw of the wheel coincides with the set final target hydraulic pressure Pwt**. With this operation, one of the vehicle stabilization control and the LSD control is selectively performed or both the vehicle stabilization control and the LSD control are simultaneously performed through application of braking force by means of brake hydraulic pressure.

Subsequently, the CPU 51 proceeds to step 1325 so as to determine whether the TCS switch 47 is in an ON state. Since the TCS switch 47 is in an ON state at the present point in time, the CPU 51 makes a "Yes" determination in step 1325, and then proceeds to step 1330 so as to issue an instruction for lowering the output of the engine 21 by an amount corresponding to the maximum value among the traction-control-use control values Gtcs obtained in the previously described step 1015 and the vehicle-stabilization-control-use control value Gstr obtained in the previously described step 1115**.

With this operation, when the maximum value is not "0," the above-described engine-output lowering control on the basis of the traction control and/or the vehicle stabilization control is executed. Subsequently, the CPU 51 proceeds to step 1395 so as to end the current execution of the present routine. The above is the operation for the case where the driver has set the TCS switch 47 into an ON state.

<Case where the TCS Switch 47 is in an OFF State>

Next, the operation for the case where the driver has switched the TCS switch 47 from an ON state to an OFF state will be described.

In this case, the CPU 51, which repeatedly executes the routine of FIG. 10 every time the predetermined time elapses, makes a "No" determination when it proceeds to step 1005, and then proceeds to step 1020 so as to set the traction-control-use control values Gtcs** of all the wheels to "0." As a result, execution of the traction control is prohibited.

Further, the CPU 51, which repeatedly executes the routine of FIG. 12 every time the predetermined time elapses, makes a "No" determination when it proceeds to step 1205. In this case, the CPU 51 proceeds to step 1265 so as to obtain the wheel-speed-difference correction amount ΔVwtolinc on the basis of the yaw rate deviation ΔYr calculated in the previously described step 930 and with reference to the table MapΔVwtolinc shown in FIG. 7.

Subsequently, the CPU 51 proceeds to step 1270 so as to obtain the control-use front-wheel-side wheel speed difference ΔVwfs (≧0) in accordance with the above-described Equation (6) and on the basis of the absolute value |ΔVwfl| of the front-wheel-side wheel speed difference calculated in the previously described step 935 and the obtained wheel-speed-difference correction amount ΔVwtolinc.

With this operation, when the yaw-rate deviation ΔYr is greater than the threshold value Yrth (that is, the over-steer suppression control is executed), the control-use front-wheel-side wheel speed difference ΔVwfs is set to a value smaller than the absolute value |ΔVwfl| of the front-wheel-side wheel speed difference. As a result, when the over-steer suppression control is executed, in the processing of step 1225, the front-wheel-LSD-control-use control value Glsdf (accordingly, braking force for suppressing front-wheel idle rotation) is set to a smaller value as compared with the case where the over-steer suppression control is not performed.

Further, the CPU 51, which repeatedly executes the routine of FIG. 13 every time the predetermined time elapses, makes a "No" determination when it proceeds to step 1325. As a result, the above-described engine-output lowering control is prohibited.

As is apparent from above, when the driver brings the TCS switch 47 into an OFF state, the running performance and the escaping performance of the vehicle can be secured and the running stability of the vehicle can be reliably maintained as well even in the case where the over-steer suppression control and the LSD control are simultaneously performed as described with reference to FIG. 8.

As described above, in the motion control apparatus for a four-wheel drive vehicle according to the embodiment of the present invention, when the TCS switch 47 is in an OFF state, braking force is applied to the front wheel on the outer side of a turning locus by means of brake hydraulic pressure, without execution of the engine-output lowering control in the vehicle stabilization control (over-steer suppression control). In addition, during execution of the over-steer suppression control, the braking force for suppressing front-wheel idle rotation which is imparted to the one of the left and right front wheels that is of higher wheel speed (accordingly, the front wheel located on the inner side of the turning locus) by the LSD control is reduced.

This operation intentionally permits the front wheel located on the inner side of the turning locus to produce excessive idle rotation, so that the two rear wheels become less likely to produce excessive idle rotation. As a result, the cornering forces generated by means of the tires of the two front wheels decrease, and the cornering forces generated by means of the tires of the two rear wheels are maintained. Thus, a yawing moment of a direction opposite the vehicle's yawing direction (that is, a yawing moment in the same direction as that of a yawing moment to be generated by means of the over-steer suppression control) is generated in the vehicle.

Accordingly, even when the LSD control is simultaneously executed during execution of the over-steer suppression control, the over-steer suppressing effect can be reliably achieved, so that the running stability of the vehicle can be reliably maintained. In addition, since the engine-output lowering control is not executed at this time, the running performance and the escaping performance of the vehicle can be secured.

The present invention is not limited to the above-described embodiment, and various modifications may be employed within the scope of the invention. For example, in the above-described embodiment, in order to reduce the braking force for suppressing front-wheel idle rotation (accordingly, the front-wheel-LSD-control-use control value Glsdf) during execution of the over-steer suppression control, instead of the absolute value of the front-wheel-side wheel speed difference $\Delta Vwf$, the control-use front-wheel-side wheel speed difference $\Delta Vwfs$ is used as the left-right wheel speed difference $|\Delta Vw|$, which is used for referring to the table MapGlsd shown in FIG. 6. However, the apparatus of the embodiment may configured such that during execution of the over-steer suppression control, the front-wheel-LSD-control-use control value Glsdf is set on the basis of the absolute value of the front-wheel-side wheel speed difference $\Delta Vwf$ and with reference to a table which provides a smaller LSD-control-use control value Glsd for the same left-right wheel speed difference $|\Delta Vw|$ (>Vwref) as compared with a value obtained with reference to the table shown in FIG. 6.

Further, the apparatus of the embodiment may configured to set the front-wheel-LSD-control-use control value Glsdf to a value obtained by multiplying the value obtained based on the table shown in FIG. 6 and the absolute value of the front-wheel-side wheel speed difference $\Delta Vwf$ by a coefficient $\alpha$ ($0<\alpha<1$). In this case, the coefficient $\alpha$ is preferably set such that it decreases when the yaw rate deviation $\Delta Yr$ (>Yrth), which is a value representing the degree of over-steer, increases.

In the above-described embodiment, the yaw rate deviation $\Delta Yr$ is employed as a value representing the degree of over-steer. However, a vehicle body slip angle $\beta$, which is an angle between the vehicle body fore-aft direction and the vehicle body heading direction of the vehicle, or a change speed $D\beta$ of the vehicle body slip angle $\beta$ may be employed.

In this case, the change speed $D\beta$ of the vehicle body slip angle can be estimated in accordance with the following Equation (7) from the difference between the actual yaw rate Yr and the yaw rate of the vehicle (lateral acceleration yaw rate) obtained based on the actual lateral acceleration Gy and the estimated vehicle body speed Vso, and the vehicle body slip angle $\beta$ can be obtained through time integration (cumulating) of the estimated change speed $D\beta$ of the vehicle body slip angle.

$$D\beta = Gy/Vso - Yr \quad (7)$$

What is claimed is:

1. A motion control apparatus for a four-wheel drive vehicle in which drive force of a drive source is transmitted to front wheels and rear wheels, the motion control apparatus comprising:

stabilization control execution means for obtaining a value representing the degree of over-steer in a turning state of the vehicle and, when the obtained value representing the degree of over-steer exceeds a threshold value, performing vehicle stabilization control which imparts to a front wheel located on the outer side of a turning locus a braking force for generating in the vehicle a yawing moment of a direction opposite the direction of yawing of the vehicle;

front-wheel-side idle rotation suppression control means for obtaining a difference between wheel speeds of the left and right front wheels, and, when the obtained difference between wheel speeds of the left and right front wheels exceeds a front-wheel-side allowable limit, imparting a braking force for suppressing front-wheel idle rotation to the one of the left and right front wheels that is of higher wheel speed; and rear-wheel-side idle rotation suppression control means for obtaining a difference between wheel speeds of the left and right rear wheels, and, when the obtained difference between wheel speeds of the left and right rear wheels exceeds a rear-wheel-side allowable limit, imparting a braking force for suppressing rear-wheel idle rotation to the one of the left and right rear wheels that is of higher wheel speed, wherein the front-wheel-side idle rotation suppression control means is configured such that when the vehicle stabilization control is being performed, the front-wheel-side idle rotation suppression control means lowers the braking force for suppressing front-wheel idle rotation to be imparted to the one of the left and right front wheels that is of higher wheel speed.

2. A motion control apparatus for a four-wheel drive vehicle according to claim 1, wherein the front-wheel-side idle rotation suppression control means is configured to change the extent to which the braking force for suppressing front-wheel idle rotation is reduced, in accordance with the value representing the degree of over-steer.

3. A motion control apparatus for a four-wheel drive vehicle according to claim 2, wherein
the front-wheel-side idle rotation suppression control means is configured to set the braking force for suppressing front-wheel idle rotation on the basis of the difference between wheel speeds of the left and right front wheels such that the greater the difference, the greater the braking force; and
the motion control apparatus further comprises control-use wheel-speed-difference determination means for determining a control-use front-wheel-side wheel speed difference on the basis of the value representing the degree of over-steer, the control-use front-wheel-side wheel speed-difference being smaller than the obtained difference between wheel speeds of the left and right front wheels,
wherein when the vehicle stabilization control is being executed, the front-wheel-side idle rotation suppression control means set the braking force for suppressing front-wheel idle rotation on the basis of the determined control-use front-wheel-side wheel speed difference instead of the obtained difference between wheel speeds of the left and right front wheels.

4. A motion control apparatus for a four-wheel drive vehicle according to claim 3, wherein the control-use wheel-speed-difference determination means obtains a correction value in relation to the difference between wheel speeds of the left and right front wheels on the basis of the value representing the degree of over-steer, and uses, as the control-use front-wheel-side wheel speed difference, a value obtained by subtracting the obtained correction value from the obtained difference between wheel speeds of the left and right front wheels.

5. A motion control apparatus for a four-wheel drive vehicle according to claim 1, wherein the stabilization control execution means uses, as the value representing the degree of over-steer, a value based on at least one of the difference between an actual yaw rate of the vehicle and a yaw rate of the vehicle calculated on the basis of a turning angle of steering wheels of the vehicle and a vehicle body speed of the vehicle, a vehicle body slip angle, which is an angle between a fore-aft direction of the vehicle body and a heading direction of the vehicle body, and a change rate of the vehicle body slip angle.

6. A motion control apparatus for a four-wheel drive vehicle according to claim 1, wherein the front-wheel-side idle rotation suppression control means is configured to lower the braking force for suppressing front-wheel idle rotation applied to the one of the left and right front wheels that is of higher wheel speed, when the vehicle stabilization control is being executed and a specific condition is satisfied.

7. A motion control program applied to a four-wheel drive vehicle in which drive force of a drive source is transmitted to front wheels and rear wheels, the motion control program causing a computer to perform functions for controlling motion of the vehicle, and comprising:
a stabilization control execution step of obtaining a value representing the degree of over-steer in a turning state of the vehicle and, when the obtained value representing the degree of over-steer exceeds a threshold value, performing vehicle stabilization control which imparts to a front wheel located on the outer side of a turning locus a braking force for generating in the vehicle a yawing moment of a direction opposite the direction of yawing of the vehicle;
a front-wheel-side idle rotation suppression control step of obtaining a difference between wheel speeds of the left and right front wheels, and, when the obtained difference between wheel speeds of the left and right front wheels exceeds a front-wheel-side allowable limit, imparting a braking force for suppressing front-wheel idle rotation to the one of the left and right front wheels that is of higher wheel speed; and
a rear-wheel-side idle rotation suppression control step of obtaining a difference between wheel speeds of the left and right rear wheels, and, when the obtained difference between wheel speeds of the left and right rear wheels exceeds a rear-wheel-side allowable limit, imparting a braking force for suppressing rear-wheel idle rotation to the one of the left and right rear wheels that is of higher wheel speed,
wherein the front-wheel-side idle rotation suppression control step is configured such that when the vehicle stabilization control is being performed, the front-wheel-side idle rotation suppression control step lowers the braking force for suppressing front-wheel idle rotation to be imparted to the one of the left and right front wheels that is of higher wheel speed.

* * * * *